US012713414B2

(12) United States Patent
Wang et al.

(10) Patent No.: US 12,713,414 B2
(45) Date of Patent: Aug. 18, 2026

(54) RADIO FREQUENCY LINK SWITCHING METHOD AND COMMUNICATION APPARATUS

(71) Applicant: HUAWEI TECHNOLOGIES CO., LTD., Shenzhen (CN)

(72) Inventors: Feng Wang, Shenzhen (CN); Xu Zhang, Beijing (CN); Jinlin Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 250 days.

(21) Appl. No.: 18/744,055

(22) Filed: Jun. 14, 2024

(65) Prior Publication Data

US 2024/0340876 A1 Oct. 10, 2024

Related U.S. Application Data

(63) Continuation of application No. PCT/CN2022/139175, filed on Dec. 15, 2022.

(30) Foreign Application Priority Data

Dec. 16, 2021 (CN) ......................... 202111542892.4

(51) Int. Cl.
*H04W 72/0453* (2023.01)
*H04L 27/26* (2006.01)
(Continued)

(52) U.S. Cl.
CPC ... *H04W 72/0453* (2013.01); *H04L 27/26025* (2021.01); *H04W 72/0446* (2013.01); *H04W 72/0457* (2023.01); *H04W 72/51* (2023.01)

(58) Field of Classification Search
CPC ............. H04W 72/0453; H04W 72/51; H04W 72/0457; H04W 72/0446; H04L 27/26025
See application file for complete search history.

(56) References Cited

U.S. PATENT DOCUMENTS

2024/0284426 A1* 8/2024 Liu .......................... H04L 5/001
2024/0430751 A1* 12/2024 Zhang ...................... H04B 1/00
2025/0227674 A1* 7/2025 Wang ...................... H04L 5/001

FOREIGN PATENT DOCUMENTS

JP 2021532639 A 11/2021
WO 2016133123 A1 8/2016
(Continued)

OTHER PUBLICATIONS

International Search Report issued in corresponding International Application No. PCT/CN2022/139175, dated Feb. 20, 2023, pp. 1-11.

(Continued)

*Primary Examiner* — Melvin C Marcelo
(74) *Attorney, Agent, or Firm* — HAUPTMAN HAM, LLP

(57) ABSTRACT

A radio frequency link switching method includes receiving, by a terminal device, first information from a network device. The first information indicates the terminal device to switch at least one transmit link from a first carrier group to a second carrier group. The method also includes determining, by the terminal device, a third carrier group based on a first parameter of the first carrier group and a first parameter of the second carrier group. The third carrier group is the first or second carrier group. A switching time period of the at least one transmit link is in the third carrier group. The first parameter includes one or more of a carrier bandwidth of at least one carrier, a bandwidth part in at least one carrier, identification information of at least one carrier, identification information of a cell to which at least one carrier belongs, or a quantity of carriers.

20 Claims, 5 Drawing Sheets

400

Network device

Terminal device

S401: Send first information, where the first information indicates the terminal device to switch at least one transmit link from a first carrier group to a second carrier group S402: Determine, based on a first parameter of the first carrier group and a first parameter of the second carrier group, a carrier group in which a switching time period is located S402: Determine, based on a first parameter of the first carrier group and a first parameter of the second carrier group, a carrier group in which a switching time period is located

(51) Int. Cl.

| | |
|---|---|
| ***H04W 72/0446*** | (2023.01) |
| ***H04W 72/0457*** | (2023.01) |
| ***H04W 72/51*** | (2023.01) |

(56) References Cited

FOREIGN PATENT DOCUMENTS

| | | | |
|---|---|---|---|
| WO | 2022011489 | A1 | 1/2022 |
| WO | 2022213872 | A1 | 10/2022 |

OTHER PUBLICATIONS

Office Action issued in JP2024536022 dated Jun. 26, 2025.
Extended European Search Report issued in corresponding European Application No. 22906624.6, dated Feb. 20, 2025, pp. 1-9.

* cited by examiner

RADIO FREQUENCY LINK SWITCHING METHOD AND COMMUNICATION APPARATUS

CROSS-REFERENCE TO RELATED APPLICATIONS

This application is a continuation of International Application No. PCT/CN2022/139175, filed on Dec. 15, 2022, which claims priority to Chinese Patent Application No. 202111542892.4, filed on Dec. 16, 2021. The disclosures of the aforementioned applications are hereby incorporated by reference in their entireties.

TECHNICAL FIELD

This application relates to the communication field, and more specifically, to a radio frequency link switching method and a communication apparatus.

BACKGROUND

A radio frequency (RF) link of a radio communication device may modulate a baseband signal to a radio frequency carrier to obtain a radio frequency signal, and radiate the radio frequency signal to a radio channel. One radio communication device may include one or more radio frequency links.

A network device in a mobile communication system may indicate, based on a frequency domain resource utilization status, a terminal device to switch the radio frequency link from one carrier to another carrier. However, the terminal device needs a specific switching time period to switch the radio frequency link, and cannot communicate with the network device when the terminal device performs a radio frequency link switching process. If the terminal device and the network device cannot reach an agreement on the switching time period for switching of the radio frequency link by the terminal device, a waste of resources is caused.

SUMMARY

This application provides a radio frequency link switching method and a communication apparatus, to reduce a waste of resources and improve resource utilization.

According to a first aspect, a radio frequency link switching method is provided. The method may be performed by a terminal device or a module (for example, a chip) configured (or used) in a terminal device. The following uses an example in which the terminal device performs the method for description.

The method includes: The terminal device receives first information from a network device, where the first information indicates the terminal device to switch at least one transmit link from a first carrier group to a second carrier group. The terminal device determines a third carrier group based on a first parameter of the first carrier group and a first parameter of the second carrier group, where the third carrier group is the first carrier group or the second carrier group, and a switching time period of the transmit link is located in the third carrier group. The first parameter includes one or more of the following parameters: a carrier bandwidth of at least one carrier, a bandwidth part (BWP) in at least one carrier, identification information of at least one carrier, identification information of a cell to which at least one carrier belongs, or a quantity of carriers.

According to the foregoing solution, the network device and the terminal device determine, in a same manner of determining the carrier group in which the switching time period is located, the carrier group in which the switching time period is located, so that the network device and the terminal device reach an agreement on a carrier in which the switching time period is located. This can reduce a waste of resources and improve communication reliability.

With reference to the first aspect, in some implementations of the first aspect, the third carrier group is a carrier group whose sum of parameter values of first parameters of included carriers is the largest or the smallest in the first carrier group and the second carrier group, or the third carrier group is a carrier group to which a carrier whose parameter value of a first parameter is the largest or the smallest belongs in the first carrier group and the second carrier group. With reference to the first aspect, in some implementations of the first aspect, that the terminal device determines a third carrier group based on a first parameter of the first carrier group and a first parameter of the second carrier group includes: When a parameter value of a second parameter of the first carrier group is the same as a parameter value of a second parameter of the second carrier group, the terminal device determines the third carrier group based on the first parameter of the first carrier group and the first parameter of the second carrier group. The second parameter is different from the first parameter, and the second parameter includes one or more of the following parameters: a carrier bandwidth of at least one carrier, a bandwidth part BWP in at least one carrier, identification information of at least one carrier, identification information of a cell to which at least one carrier belongs, a quantity of carriers, or a switching parameter of at least one carrier.

According to the foregoing solution, before the terminal device and the network device determine, based on the first parameter of the first carrier group and the first parameter of the second carrier group, the carrier group in which the switching time period is located, the terminal device and the network device separately determine, based on the second parameter of the first carrier group and the second parameter of the second carrier group, the carrier group in which the switching time period is located. Then, if the parameter value of the second parameter of the first carrier group is the same as the parameter value of the second parameter of the second carrier group, the terminal device and the network device determine, based on the first parameter of the first carrier group and the first parameter of the second carrier group, that the carrier group in which the switching time period is located is the third carrier group. When the terminal device and the network device cannot determine, based on a second parameter of a carrier group, the carrier group in which the switching time period is located, the terminal device and the network device can determine, based on a first parameter of the carrier group, the carrier group in which the switching time period is located, so that the network device and the terminal device reach an agreement on the carrier in which the switching time period is located. This can reduce a waste of resources and improve communication reliability.

With reference to the first aspect, in some implementations of the first aspect, the method further includes: The terminal device receives a plurality of pieces of second information from the network device, where the plurality of pieces of second information correspond to a plurality of carriers, the plurality of carriers are a plurality of carriers that are configured by the network device and that are used for switching the transmit link, and each piece of second information indicates a parameter value of a first parameter of a corresponding carrier.

With reference to the first aspect, in some implementations of the first aspect, the method further includes: The terminal device receives third information from the network device, where the third information indicates the plurality of carriers, and the first carrier group and the second carrier group belong to the plurality of carriers.

With reference to the first aspect, in some implementations of the first aspect, the method further includes: The terminal device determines, based on a largest subcarrier spacing in subcarrier spacings of the plurality of carriers, a slot length corresponding to the largest subcarrier spacing, where the terminal device switches the transmit link at most once in the slot length.

According to the foregoing solution, the terminal device and the network device may determine the largest subcarrier spacing based on the subcarrier spacings of the plurality of carriers that are configured by the network device and that are used for switching the transmit link, to determine that the terminal device switches the transmit link at most once in the slot length corresponding to the largest subcarrier spacing. In this way, the terminal device and the network device can reach an agreement on a time limit or a limit of times for switching the transmit link by the terminal device, and a case in which communication quality is affected because the terminal device frequently switches the transmit link can be avoided. When supported by a capability of the terminal device, the capability of the terminal device can be fully used to improve scheduling flexibility of the network device.

With reference to the first aspect, in some implementations of the first aspect, the method further includes: The terminal device sends first capability information to the network device, where the first capability information indicates first duration, and the terminal device switches the transmit link at most once in the first duration.

According to the foregoing solution, the terminal device and the network device determine, based on a capability of the terminal device, a time limit or a limit of times for switching the transmit link by the terminal device, so that the terminal device and the network device can reach an agreement on the time limit or the limit of times for switching the transmit link by the terminal device, and a case in which communication quality is affected because the terminal device frequently switches the transmit link can be avoided. When supported by the capability of the terminal device, the capability of the terminal device can be fully used to improve scheduling flexibility of the network device.

With reference to the first aspect, in some implementations of the first aspect, the first capability information specifically indicates a first subcarrier spacing, and a slot length corresponding to the first subcarrier spacing is the first duration: the first capability information specifically indicates a first frequency band, and a slot length corresponding to a subcarrier spacing of the first frequency band is the first duration: the first capability information specifically indicates a quantity N of symbols of first preset duration, N pieces of first preset duration are the first duration, and N is a positive integer: or the first capability information specifically indicates a quantity M of slots of second preset duration, M pieces of second preset duration are the first duration, and M is a positive integer.

With reference to the first aspect, in some implementations of the first aspect, the method further includes: The terminal device determines first duration based on a first subcarrier spacing, where the terminal device switches the transmit link at most once in the first duration, the first subcarrier spacing is a largest subcarrier spacing in a subcarrier spacing of at least one frequency band, and the at least one frequency band is a frequency band in which the terminal device supports the switching of the transmit link.

According to the foregoing solution, the terminal device and the network device determine, based on the subcarrier spacing of the frequency band in which the terminal device supports the switching of the transmit link, a time limit or a limit of times for switching the transmit link by the terminal device, so that the terminal device and the network device can reach an agreement on the time limit or the limit of times for switching the transmit link by the terminal device, and a case in which communication quality is affected because the terminal device frequently switches the transmit link can be avoided. When supported by a capability of the terminal device, the capability of the terminal device can be fully used to improve scheduling flexibility of the network device.

According to a second aspect, a radio frequency link switching method is provided. For beneficial effects, refer to the descriptions in the first aspect. Details are not described herein again. The method may be performed by a network device or a module (for example, a chip) configured (or used) in a network device. The following uses an example in which the network device performs the method for description.

The method includes: The network device sends first information to a terminal device, where the first information indicates the terminal device to switch at least one transmit link from a first carrier group to a second carrier group. The network device determines a third carrier group based on a first parameter of the first carrier group and a first parameter of the second carrier group, where the third carrier group is the first carrier group or the second carrier group, and a switching time period of the transmit link is located in the third carrier group. The first parameter includes one or more of the following parameters: a carrier bandwidth of at least one carrier, a bandwidth part BWP in at least one carrier, identification information of at least one carrier, identification information of a cell to which at least one carrier belongs, or a quantity of carriers.

With reference to the second aspect, in some implementations of the second aspect, the third carrier group is a carrier group whose sum of parameter values of first parameters of included carriers is the largest or the smallest in the first carrier group and the second carrier group, or the third carrier group is a carrier group to which a carrier whose parameter value of a first parameter is the largest or the smallest belongs in the first carrier group and the second carrier group.

With reference to the second aspect, in some implementations of the second aspect, that the network device determines a third carrier group based on a first parameter of the first carrier group and a first parameter of the second carrier group includes: When a parameter value of a second parameter of the first carrier group is the same as a parameter value of a second parameter of the second carrier group, the network device determines the third carrier group based on the first parameter of the first carrier group and the first parameter of the second carrier group. The second parameter is different from the first parameter, and the second parameter includes one or more of the following parameters: a carrier bandwidth of at least one carrier, a bandwidth part BWP in at least one carrier, identification information of at least one carrier, identification information of a cell to which at least one carrier belongs, a quantity of carriers, or a switching parameter of at least one carrier.

With reference to the second aspect, in some implementations of the second aspect, the method further includes: The network device sends a plurality of pieces of second information to the terminal device, where the plurality of pieces of second information correspond to a plurality of carriers, the plurality of carriers are a plurality of carriers that are configured by the network device and that are used for switching the transmit link, and each piece of second information indicates a parameter value of a first parameter of a corresponding carrier.

With reference to the second aspect, in some implementations of the second aspect, the method further includes: The network device sends third information to the terminal device, where the third information indicates the plurality of carriers, and the first carrier group and the second carrier group belong to the plurality of carriers.

With reference to the second aspect, in some implementations of the second aspect, the method further includes: The network device determines a slot length based on a largest subcarrier spacing in subcarrier spacings of the plurality of carriers, where the network device indicates the terminal device to switch the transmit link at most once in the slot length.

With reference to the second aspect, in some implementations of the second aspect, the method further includes: The network device receives first capability information from the terminal device, where the first capability information indicates first duration, and the network device indicates the terminal device to switch the transmit link at most once in the first duration.

With reference to the second aspect, in some implementations of the second aspect, the first capability information specifically indicates a first subcarrier spacing, and a slot length corresponding to the first subcarrier spacing is the first duration: the first capability information specifically indicates a first frequency band, and a slot length corresponding to a subcarrier spacing of the first frequency band is the first duration: the first capability information specifically indicates a quantity N of symbols of first preset duration, N pieces of first preset duration are the first duration, and N is a positive integer: or the first capability information specifically indicates a quantity M of slots of second preset duration, M pieces of second preset duration are the first duration, and M is a positive integer.

With reference to the second aspect, in some implementations of the second aspect, the method further includes: The network device determines the first duration based on the first subcarrier spacing, where the network device indicates the terminal device to switch the transmit link at most once in the first duration, the first subcarrier spacing is a largest subcarrier spacing in a subcarrier spacing of at least one frequency band, and the at least one frequency band is a frequency band in which the terminal device supports the switching of the transmit link. According to a third aspect, a radio frequency link switching method is provided. The method may be performed by a terminal device or a module (for example, a chip) configured (or used) in a terminal device. The following uses an example in which the terminal device performs the method for description.

The method includes: The terminal device receives third information from a network device, where the third information indicates a plurality of carriers, and the plurality of carriers are a plurality of carriers that are configured by the network device and that are used for switching a transmit link. The terminal device determines, based on a largest subcarrier spacing in subcarrier spacings of the plurality of carriers, a slot length corresponding to the largest subcarrier spacing, where the terminal device switches the transmit link at most once in the slot length.

According to a fourth aspect, a radio frequency link switching method is provided. The method may be performed by a network device or a module (for example, a chip) configured (or used) in a network device. The following uses an example in which the network device performs the method for description.

The method includes: The network device sends third information to a terminal device, where the third information indicates a plurality of carriers, and the plurality of carriers are a plurality of carriers that are configured by the network device and that are used for switching a transmit link. The network device determines, based on a largest subcarrier spacing in subcarrier spacings of the plurality of carriers, a slot length corresponding to the largest subcarrier spacing, where the network device indicates the terminal device to switch the transmit link at most once in the slot length.

According to a fifth aspect, a radio frequency link switching method is provided. The method may be performed by a terminal device or a module (for example, a chip) configured (or used) in a terminal device. The following uses an example in which the terminal device performs the method for description.

The method includes: The terminal device determines at least one carrier in an activated state, where the at least one carrier belongs to a plurality of carriers that are configured by a network device and that are used for switching a transmit link. The terminal device determines, based on a largest subcarrier spacing in a subcarrier spacing of the at least one carrier, a slot length corresponding to the largest subcarrier spacing, where the terminal device switches the transmit link at most once in the slot length.

According to a sixth aspect, a radio frequency link switching method is provided. The method may be performed by a network device or a module (for example, a chip) configured (or used) in a network device. The following uses an example in which the network device performs the method for description.

The method includes: The network device determines at least one carrier in an activated state, where the at least one carrier belongs to a plurality of carriers that are configured by the network device for a terminal device and that are used for switching a transmit link. The network device determines, based on a largest subcarrier spacing in a subcarrier spacing of the at least one carrier, a slot length corresponding to the largest subcarrier spacing, where the network device indicates the terminal device to switch the transmit link at most once in the slot length.

According to a seventh aspect, a radio frequency link switching method is provided. The method may be performed by a terminal device or a module (for example, a chip) configured (or used) in a terminal device. The following uses an example in which the terminal device performs the method for description.

The method includes: The terminal device sends first capability information to a network device, where the first capability information indicates first duration, and the terminal device switches a transmit link at most once in the first duration.

For the first capability information, refer to the descriptions in the first aspect. For brevity, details are not described herein again.

According to an eighth aspect, a radio frequency link switching method is provided. The method may be performed by a network device or a module (for example, a chip) configured (or used) in a network device. The following uses an example in which the network device performs the method for description.

The method includes: The network device receives first capability information from a terminal device, where the first capability information indicates first duration, and the network device indicates the terminal device to switch a transmit link at most once in the first duration.

For the first capability information, refer to the descriptions in the second aspect. For brevity, details are not described herein again.

According to a ninth aspect, a radio frequency link switching method is provided. The method may be performed by a terminal device or a module (for example, a chip) configured (or used) in a terminal device. The following uses an example in which the terminal device performs the method for description.

The method includes: The terminal device sends second capability information to a network device, where the second capability information indicates at least one frequency band in which the terminal device supports switching of a transmit link. The terminal device determines first duration based on a first subcarrier spacing, where the terminal device switches the transmit link at most once in the first duration, and the first subcarrier spacing is a largest subcarrier spacing in a subcarrier spacing of the at least one frequency band.

According to a tenth aspect, a radio frequency link switching method is provided. The method may be performed by a network device or a module (for example, a chip) configured (or used) in a network device. The following uses an example in which the network device performs the method for description.

The method includes: The network device receives second capability information from a terminal device, where the second capability information indicates at least one frequency band in which the terminal device supports switching of a transmit link. The network device determines first duration based on a first subcarrier spacing, where the network device indicates the terminal device to switch the transmit link at most once in the first duration, and the first subcarrier spacing is a largest subcarrier spacing in a subcarrier spacing of the at least one frequency band.

According to an eleventh aspect, a communication apparatus is provided, including a processing unit and a transceiver unit. The transceiver unit is configured to receive and send data under control of the processing unit. The processing unit is configured to: read a computer program in a storage unit, and perform the method in any one of the first aspect to the tenth aspect or the possible implementations of the first aspect to the tenth aspect.

Optionally, the communication apparatus further includes the storage unit.

According to a twelfth aspect, a communication apparatus is provided, including a processor. The processor may implement the method in any one of the first aspect to the tenth aspect or the possible implementations of the first aspect to the tenth aspect.

Optionally, the communication apparatus further includes a memory. The processor is coupled to the memory, and may be configured to execute instructions in the memory, to implement the method in any possible implementation of the first aspect to the tenth aspect.

Optionally, the communication apparatus further includes a communication interface, and the processor is coupled to the communication interface. In embodiments of this application, the communication interface may be a transceiver, a pin, a circuit, a bus, a module, or a communication interface of another type. This is not limited.

In an implementation, the communication interface may be a transceiver or an input/output interface.

In another implementation, the communication apparatus is a chip configured in a communication device (for example, a network device or a terminal device). When the communication apparatus is the chip configured in the communication device, the communication interface may be an input/output interface, and the processor may be a logic circuit.

Optionally, the transceiver may be a transceiver circuit. Optionally, the input/output interface may be an input/output circuit.

According to a thirteenth aspect, a processor is provided, including an input circuit, an output circuit, and a processing circuit. The processing circuit is configured to: receive a signal through the input circuit, and transmit a signal through the output circuit, to enable the processor to perform the method in any possible implementation of the first aspect to the tenth aspect.

In a specific implementation process, the processor may be one or more chips, the input circuit may be an input pin, and the output circuit may be an output pin.

According to a fourteenth aspect, a computer program product is provided. The computer program product includes: a computer program (which may also be referred to as code or instructions). When the computer program is run, the method in any possible implementation of the first aspect to the tenth aspect can be implemented.

According to a fifteenth aspect, a computer-readable storage medium is provided. The computer-readable storage medium stores a computer program (which may also be referred to as code or instructions). When the computer program is run on a computer, the method in any possible implementation of the first aspect to the tenth aspect can be implemented.

According to a sixteenth aspect, a communication system is provided, including at least one terminal device described above and at least one network device described above.

DESCRIPTION OF EMBODIMENTS

The following describes technical solutions of this application with reference to accompanying drawings.

To make the objectives, technical solutions, and advantages of embodiments of this application clearer, the following describes the technical solutions in embodiments of this application with reference to the accompanying drawings in embodiments of this application. It is clear that, the described embodiments are merely a part rather than all of embodiments of this application. All other embodiments obtained by a person of ordinary skill in the art based on embodiments of this application without creative efforts shall fall within the protection scope of this application.

In the specification, the claims, and the accompanying drawings of embodiments of this application, the terms "first", "second", and the like are intended to distinguish between similar objects but do not necessarily indicate a specific order or sequence. It should be understood that the data termed in such a way are interchangeable in proper circumstances so that embodiments of this application described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

The technical solutions in embodiments of this application may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system or a new radio (NR) system, and a future communication system such as a 6th generation mobile communication system. This is not limited in this application.

Figure 1:
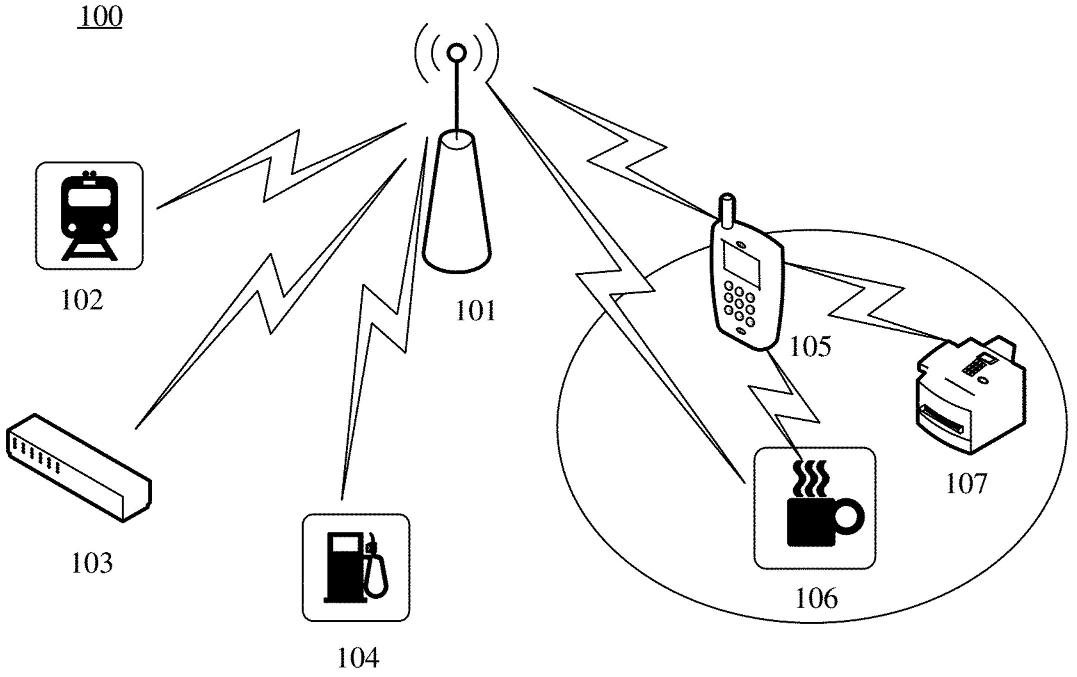
FIG. 1 is a diagram of a communication system according to an embodiment of this application.

FIG. 1 is a diagram of a structure of a communication system applicable to this application.

As shown in FIG. 1, a communication system 100 may include at least one network device, such as a network device 101 shown in FIG. 1. The communication system 100 may further include at least one terminal device, such as terminal devices 102 to 107 shown in FIG. 1. The terminal devices 102 to 107 may be mobile or fixed. The network device 101 may communicate with one or more of the terminal devices 102 to 107 through a radio link. A radio frequency link switching method provided in embodiments of this application may be used between the network device and the terminal device to implement uplink transmission of the terminal device.

The terminal device in embodiments of this application may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet computer, a computer with a wireless transceiver function, a virtual reality (VR) terminal device, an augmented reality (AR) terminal device, a wireless terminal in industrial control, a wireless terminal in unmanned driving, a wireless terminal in telemedicine, a wireless terminal in a smart grid, a wireless terminal in transportation security, a wireless terminal in a smart city, a wireless terminal in a smart home, a cellular phone, a cordless phone, a session initiation protocol (SIP) phone, a wireless local loop (WLL) station, a personal digital assistant (PDA), a handheld device with a wireless communication function, a computing device, a vehicle-mounted device, a wearable device, a terminal device in a 5G network, a terminal device in a future evolved public land mobile network (PLMN), or the like. It should be understood that a specific form of the terminal device is not limited in this application.

The network device in embodiments of this application may be a device that has a wireless transceiver function in an access network. The device includes but is not limited to: a base station, an evolved NodeB (eNB), a radio network controller (RNC), a NodeB (NB), a base station controller (BSC), a base transceiver station (BTS), a home base station (for example, a home evolved NodeB, or a home NodeB, HNB), an access point (AP) in a wireless fidelity (Wi-Fi) system, a wireless relay node, a wireless backhaul node, a transmission point (TP), or a transmission reception point (TRP). Alternatively, the device may be a network node that forms a gNB or a transmission point, for example, a distributed unit (DU). It should be understood that a specific form of the network device is not limited in this application.

The following describes related technologies and terms in embodiments of this application.

1. Carrier Aggregation

The network device may configure a plurality of cells for the UE. Each cell includes one downlink carrier and zero to two uplink carriers. The downlink carrier is used to carry downlink information sent by the network device to the UE, and the uplink carrier is used to carry uplink information sent by the UE to the network device. The network device may activate, for the UE, some of the plurality of cells that are configured, and the network device may communicate with the UE on a carrier of the some cells. Based on an uplink communication capability of the UE, different quantities of configured and activated uplink carriers can be supported.

2. Transmit Link (Tx)

The transmit link is a radio frequency link used to send a signal, and may also be referred to as a transmit path or a radio frequency transmit path, where the transmit path and the radio frequency transmit path are all referred to as a transmit path in this application. In this application, the transmit path may operate in the following manner, but is not limited to the following manner: The transmit path may receive a baseband signal from a baseband chip, perform radio frequency processing (such as up-conversion, amplification, and filtering) on the baseband signal to obtain a radio frequency signal, and radiate the radio frequency signal to space through an antenna. Specifically, the transmit path may include but is not limited to one or more electronic components of an antenna switch, an antenna tuner, a low noise amplifier (LNA), a power amplifier (PA), a mixer, a local oscillator (local oscillator, LO), and a filter. These electronic components may be integrated into one or more chips based on a requirement. In addition, the antenna may alternatively be considered as a part of the transmit path. Optionally, the transmit path in this application may be replaced with a radio frequency chain, a Tx, an antenna, radio frequency, a transmit path, a transmit port, a receive path, or any combination thereof.

In a mobile communication system, two manners shown in Table 1 are defined for a terminal device that has two transmit links and that supports switching of the transmit link between two carriers. A carrier 1 and a carrier 2 represent the two uplink carriers respectively, and T represents a radio frequency chain. Manner 1 in Table 1 indicates that the terminal device has one transmit link in the carrier 1, and the terminal device may perform 1-port transmission on the carrier 1; and the terminal device has one transmit link in the carrier 2, and the terminal device may perform the 1-port transmission on the carrier 2. Manner 2 indicates that the terminal device has no transmit link in the carrier 1, and has two transmit links in the carrier 2. In this manner, the terminal device may perform 2-port transmission on the carrier 2. It may be learned that the terminal device supports a maximum of one transmit link in the carrier 1, and supports a maximum of two transmit links in the carrier 2. The terminal device may switch between the two manners, in other words, may switch one transmit link between the carrier 1 and the carrier 2. The switching of the transmit link by the terminal device needs a switching time period. The switching time period may be referred to as an uplink switching gap. The terminal device does not expect to perform transmission on either of the two carriers in the uplink switching gap.

TABLE 1

| | Quantity of transmit links in (the carrier 1 + the carrier 2) |
|---|---|
| Manner 1 | 1 T + 1 T |
| Manner 2 | 0 T + 2 T |

The network device may configure, for the terminal device based on configuration information, a carrier in which the switching time period is located. For example, the network device may send uplink transmit link switching information (denoted as UplinkTxSwitching) to the terminal device. The information may be as follows:

```
UplinkTxSwitching::=   SEQUENCE{
  uplinkTxSwitchingPeriodLocation    BOOLEAN,
  uplinkTxSwitchingCarrier        ENUMERATED{carrier1, carrier2}
}
```

The uplink transmit link switching information may include but is not limited to uplink transmit link switching time period location information (uplinkTxSwitchingPeriodLocation) and an uplink transmit link switching carrier (uplinkTxSwitchingCarrier). uplinkTxSwitchingCarrier enumerates (ENUMERATED) one carrier in the carrier 1 (carrier 1) and the carrier 2 (carrier 2), in other words, the network device indicates one of the carriers in the carrier 1 and the carrier 2 based on the information, and indicates true (True) or false (False) based on uplinkTxSwitchingPeriodLocation to notify the terminal device whether the uplink transmit link switching time period is located in the carrier. For example, uplinkTxSwitchingCarrier indicates the carrier 1. If uplinkTxSwitchingPeriodLocation indicates True, the terminal device may determine that the switching time period is located in the carrier 1: or if uplinkTxSwitchingPeriodLocation indicates False, the terminal device may determine that the switching time period is not located in the carrier.

In this application, that the transmit link is in a carrier may be understood as that the terminal device may adjust a parameter of the transmit link, so that the terminal device may perform uplink transmission on the carrier based on the transmit link. In addition, that the switching time period of the transmit link is located in the carrier may be understood as that the switching time period belongs to a time range of the transmit link in the carrier, or may be understood as that the switching time period is in an uplink time unit of the carrier. For example, if the switching time period of the transmit link is located in the carrier 1, it indicates that the switching time period is in an uplink slot of the carrier 1.

Figure 2:
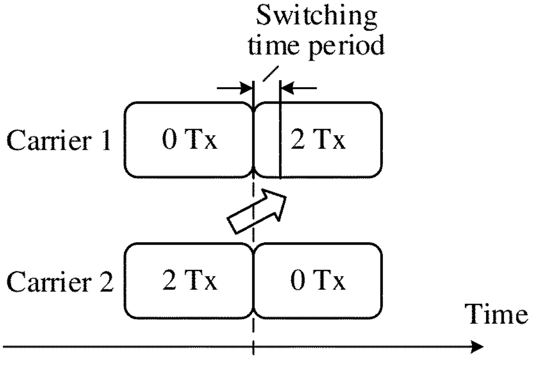
FIG. 2 is a diagram of switching a transmit link according to an embodiment of this application.
Figure 3:
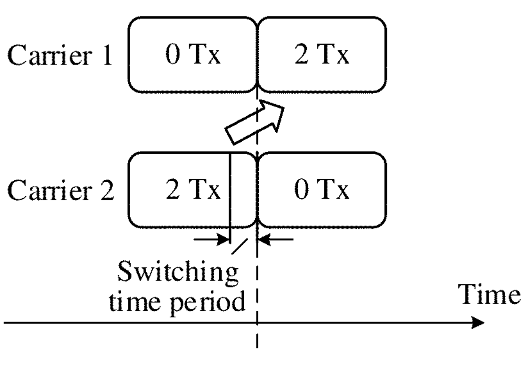
FIG. 3 is another diagram of switching a transmit link according to an embodiment of this application.

In an example, if the network device may notify, based on the transmit link switching information, the terminal device that the switching time period of the transmit link is located in the carrier 1, the terminal device determines, after receiving the uplink transmit link switching information, that the switching time period is located in the carrier 1. For example, as shown in FIG. 2, if two transmit links of the terminal device before the switching are both in the carrier 2, and the network device may notify the terminal device that the 2-port transmission is to be performed on the carrier 1, the terminal device needs to switch the two transmit links from the carrier 2 to the carrier 1. In this case, the terminal device determines, based on the transmit link switching information, that the switching time period is located in the carrier 1, as shown in FIG. 2. In another example, when the network device configures that the switching time period of the transmit link is located in the carrier 2, and the network device indicates the terminal device to switch two transmit links from the carrier 2 to the carrier 1, as shown in FIG. 3, the terminal device and the network device may determine that the switching time period of the transmit link is located in the carrier 2, and the terminal device switches the transmit link in the switching time period in the carrier 2. In this way, the terminal device and the network device can reach an agreement on the carrier in which the switching time period is located, and do not perform communication in the switching time period. In other words, the network device does not schedule the terminal device to send the uplink information in the switching time period, and the terminal device does not send the uplink information to the network device in the switching time period. If the terminal device and the network device do not reach an agreement on the carrier in which the switching time period is located, the terminal device and the network device cannot determine whether the switching time period is located in a carrier before the switching or in a carrier after the switching. This causes a waste of resources.

With enhancement of technologies, the terminal device may support a larger quantity of carriers used for switching the transmit link. For example, the terminal device may switch the transmit link between at least three carriers. Because the foregoing manner of indicating the switching time period is designed for switching the transmit link between two carriers by the terminal device, only whether the switching time period is in one carrier can be indicated. When the terminal device supports switching the transmit link between more carriers, the foregoing manner of indicating, by the network device to the terminal device, the carrier in which the switching time period is located is no longer applicable. For example, the terminal device supports switching the uplink transmit link between three carriers: the carrier 1, the carrier 2, and a carrier 3. If the network device separately configures, in the foregoing manner, whether the switching time period is located in the carrier 1, the carrier 2, and the carrier 3, for example, uplinkTxSwitchingPeriodLocation corresponding to the carrier 1, the carrier 2, and the carrier 3 respectively indicate "true", "false", and "false". The terminal device may determine that the switching time period is located in the carrier 1, the switching time period is not located in the carrier 2, and the switching time period is not located in the carrier 3. If the network device indicates the terminal device to switch the transmit link in the carrier 2 and the carrier 3, because the switching time period configured by the network device is not in the two carriers, the terminal device and the network device cannot determine the carrier in which the switching time period is located. Alternatively, if the network device configures the switching time period to be located in two of the three carriers, when the network device indicates the terminal device to perform switching in the two carriers, both the two carriers include one switching time period. However, actually, the terminal device does not need such a long time period to switch the transmit link. This causes a waste of resources. Therefore, currently, there is still a lack of a manner that is suitable for indicating the switching time period and that enables the network device and the terminal device to reach, when the terminal device supports switching the transmit link between a plurality of carriers, an agreement on the carrier in which the switching time period is located.

The following describes a transmit link switching method provided in this application with reference to the accompanying drawings.

Figure 4:
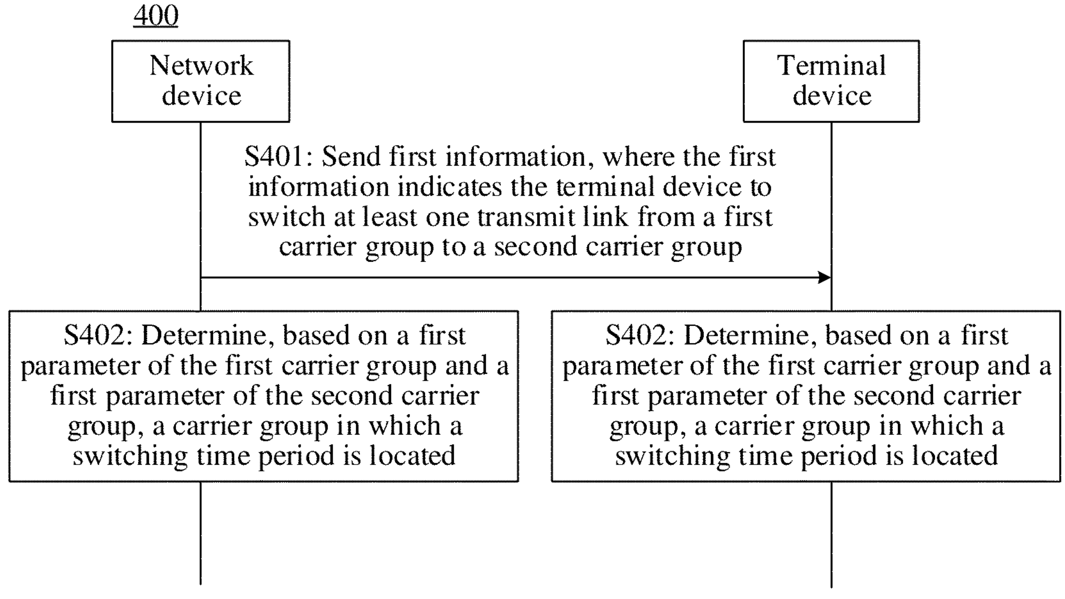
FIG. 4 is a schematic flowchart of a radio frequency link switching method according to an embodiment of this application.

FIG. 4 is a schematic flowchart of a radio frequency link switching method according to an embodiment of this application.

S401: A network device sends first information to a terminal device, where the first information indicates the terminal device to switch at least one transmit link from a first carrier group to a second carrier group.

Correspondingly, the terminal device receives the first information from the network device, and determines, based on the first information, to switch the at least one transmit link from the first carrier group to the second carrier group.

Optionally, when the at least one transmit link of the terminal device is in the first carrier group, the network device may send the first information to the terminal device. The first information is specifically used to schedule or configure the at least one transmit link of the terminal device to perform uplink transmission on the second carrier group. The terminal device receives the first information and determines to switch the at least one transmit link from the first carrier group to the second carrier group. In this way, the network device indicates, based on the first information, the terminal device to switch the at least one transmit link from the first carrier group to the second carrier group.

For example, when two transmit links of the terminal device are respectively in a carrier 1 and a carrier 2, the network device sends the first information to the terminal device, where the first information is used to schedule the terminal device to perform 2-port transmission on a carrier 3. In this case, the terminal device may determine to switch the two transmit links from the first carrier group (including the carrier 1 and the carrier 2) to the second carrier group (including the carrier 3).

Optionally, the network device may send third information to the terminal device, where the third information indicates a plurality of carriers, and the plurality of carriers are a plurality of carriers that are configured by the network device for the terminal device and that are used for switching the transmit link. The first carrier group and the second carrier group belong to the plurality of carriers.

In this application, the plurality of carriers that are configured by the network device for the terminal device and that are used for switching the transmit link may be understood as a plurality of carriers that are configured by the network device for the terminal device and that may be used for dynamically switching the transmit link.

Correspondingly, the terminal device receives the third information from the network device, and determines, based on the third information, the plurality of carriers that are configured by the network device and that are used for switching the transmit link.

The network device may determine the second carrier group from the plurality of carriers, and indicate, based on the first information, the terminal device to switch the at least one transmit link from the first carrier group to the second carrier group.

S402: The network device and the terminal device separately determine, based on a first parameter of the first carrier group and a first parameter of the second carrier group, a carrier group in which a switching time period is located.

The network device and the terminal device may separately determine a third carrier group based on the first parameter of the first carrier group and the first parameter of the second carrier group. The switching time period for switching the at least one transmit link by the terminal device is located in the third carrier group. The third carrier group is a carrier group in the first carrier group and the second carrier group, that is, the third carrier group is the first carrier group or the second carrier group.

It should be noted that the network device and the terminal device separately perform S402. After determining to indicate the terminal device to switch the at least one transmit link from the first carrier group to the second carrier group, the network device may determine the carrier group in which the switching time period is located. After receiving the first information and determining to switch the at least one transmit link from the first carrier group to the second carrier group, the terminal device may determine the carrier group in which the switching time period is located. A sequence of performing S402 by the network device and performing S402 by the terminal device is not limited in this embodiment of this application. Both the network device and the terminal device determine, based on the first parameters of the carrier groups before and after the switching, the carrier group in which the switching time period is located, so that the network device and the terminal device reach an agreement on the carrier group in which the switching time period is located. This can reduce a waste of resources and improve communication reliability.

The first parameter may include but is not limited to one or more of the following parameters:

a quantity of carriers, a carrier bandwidth of at least one carrier, a bandwidth part (bandwidth part, BWP) in at least one carrier, identification information of at least one carrier, identification information of a cell to which at least one carrier belongs, a parameter indicating whether a cell in which a carrier is located is a primary cell (PCell) or a primary secondary cell, or a switching parameter of at least one carrier.

A primary cell in a secondary cell group (SCG) may be referred to as a primary secondary cell (primary SCG Cell, PSCell).

The following separately describes specific implementations in which the first parameter includes the one or more of the foregoing parameters. However, this application is not limited thereto.

Implementation 1: The first parameter is the quantity of carriers, and the network device and the terminal device separately determine the third carrier group based on a quantity of carriers in the first carrier group and a quantity of carriers in the second carrier group.

The network device and the terminal device separately determine, based on the quantities of carriers included in the carrier groups before and after the switching of the transmit link, whether the switching time period is in the carrier group before the switching or the carrier group after the switching. The network device and the terminal device determine, based on a same parameter, the carrier group in which the switching time period is located, so that the network device and the terminal device reach an agreement on a carrier in which the switching time period is located. This can reduce a waste of resources and improve communication reliability.

In an example, the third carrier group is a carrier group that has a smallest quantity of carriers in the first carrier group and the second carrier group.

Figure 5:
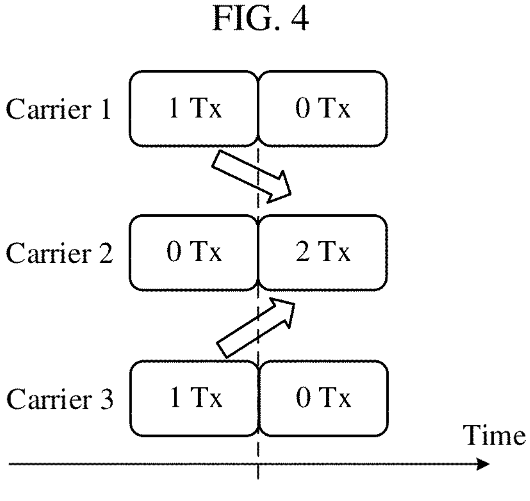
FIG. 5 is a diagram of switching a transmit link according to an embodiment of this application.

For example, as shown in FIG. 5, when the two transmit links of the terminal device are respectively in the carrier 1 and the carrier 3, the network device indicates, based on the first information, the terminal device to switch the two transmit links to the carrier 2 (for example, schedule the terminal device to perform the 2-port transmission on the carrier 2). In this example, the first carrier group includes the carrier 1 and the carrier 3, the quantity of carriers in the first carrier group is 2, the second carrier group includes the carrier 2, and the quantity of carriers in the second carrier group is 1. After receiving the first information, the terminal device determines to switch the two transmit links from the carrier 1 and the carrier 3 to the carrier 2. The network device and the terminal device determine, based on that the quantity of carriers in the first carrier group is 2 and the quantity of carriers in the second carrier group is 1, that the quantity of carriers in the second carrier group is the smallest, and that the switching time period is located in the second carrier group (that is, the third carrier group in which the switching time period is located is the second carrier group). In this way, the terminal device and the network device can reach an agreement. In this manner, the switching time period can occupy a small quantity of carrier resources. This can reduce a waste of resources and improve resource utilization.

Figures 6, 7:
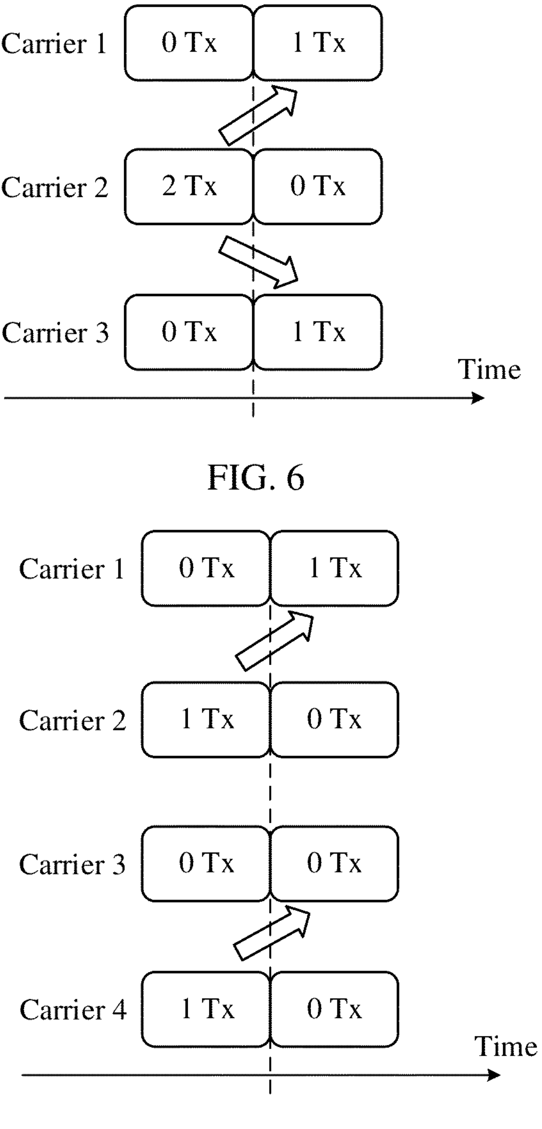
FIG. 6 is another diagram of switching a transmit link according to an embodiment of this application.
FIG. 7 is another diagram of switching a transmit link according to an embodiment of this application.

For another example, as shown in FIG. 6, when the two transmit links of the terminal device are both in the carrier 2, the network device indicates, based on the first information, the terminal device to switch the two transmit links respectively to the carrier 1 and the carrier 3. In this example, the first carrier group includes the carrier 2, the quantity of carriers in the first carrier group is 1, the second carrier group includes the carrier 1 and the carrier 3, and the quantity of carriers in the second carrier group is 2. The network device and the terminal device separately determine, based on that the quantity of carriers in the first carrier group is 1 and the quantity of carriers in the second carrier group is 2, that the quantity of carriers in the first carrier group is the smallest, and that the switching time period is located in the first carrier group (that is, the third carrier group in which the switching time period is located is the first carrier group). Both the terminal device and the network device determine, based on the quantities of the carriers in the carrier groups before and after the switching, the carrier in which the switching time period is located, so that the terminal device and the network device can reach an agreement, and a waste of resources caused by reserving the switching time period in both the carrier groups before and after the switching because no agreement is reached can be reduced. This can reduce a waste of resources and improve communication reliability.

In another example, the third carrier group is a carrier group that has a largest quantity of carriers in the first carrier group and the second carrier group.

Both the network device and the terminal device use a carrier group that has the largest quantity of carriers in the carrier groups before and after the switching as the carrier group in which the switching time period is located, so that the network device and the terminal device reach an agreement on the carrier group in which the switching time period is located.

For example, in the example shown in FIG. 5, when the terminal device switches the two transmit links from the first carrier group (including the carrier 1 and the carrier 3) to the second carrier group (including the carrier 2), both the network device and the terminal device may determine that the switching time period is located in the first carrier group with a larger quantity of carriers, in other words, the switching time period is located in the carrier 1 and the carrier 3 that are before the switching.

For another example, in the example shown in FIG. 6, the terminal device switches the two transmit links from the first carrier group (including the carrier 2) to the second carrier group (including the carrier 1 and the carrier 3), both the network device and the terminal device may determine that the switching time period is located in the second carrier group with a larger quantity of carriers, in other words, the switching time period is located in the carrier 1 and the carrier 3 that are after the switching.

Implementation 2: The first parameter is the carrier bandwidth, and the network device and the terminal device separately determine, based on a carrier bandwidth of at least one carrier in the first carrier group and a carrier bandwidth of at least one carrier in the second carrier group, the carrier group in which the switching time period is located.

Optionally, the network device may send a plurality of pieces of information A to the terminal device, where the plurality of pieces of information A correspond to a plurality of carriers, the plurality of carriers are the plurality of carriers that are configured by the network device and that are used for switching the transmit link, and each piece of information A indicates a carrier bandwidth of a corresponding carrier.

It should be noted that the plurality of pieces of information A may be carried in a same message and sent by the network device to the terminal device, or the plurality of pieces of information A may be carried in different messages and sent separately by the network device to the terminal device. This is not limited in this application.

Optionally, the information A may be carried in a radio resource control (RRC) message or a system information block (SIB) 1.

For example, the plurality of pieces of information A may be carried in a same RRC message sent by the network device to the terminal device, or may be carried in different RRC messages.

In an example, the third carrier group is a carrier group whose sum of carrier bandwidths of included carriers is the smallest in the first carrier group and the second carrier group.

If the network device configures three carriers for the terminal device based on the third information, a carrier bandwidth of the carrier 1 is 20 MHZ, a carrier bandwidth of the carrier 2 is 100 MHz, and a carrier bandwidth of the carrier 3 is 40 MHZ.

For example, in the example shown in FIG. 5, the network device indicates the terminal device to switch the two transmit links from the carrier 1 and the carrier 3 to the carrier 2. A sum of the carrier bandwidths of the carrier 1 and the carrier 3 that are included in the first carrier group is 60 MHz. The second carrier group includes the carrier 2. A sum of the carrier bandwidth of the carrier included in the second carrier group is 100 MHz. The terminal device and the network device may determine that a carrier group that is in the first carrier group (including the carrier 1 and the carrier 3) and the second carrier group (including the carrier 2) and whose sum of carrier bandwidths of carriers is the smallest is the first carrier group, and may determine that the switching time period is located in the first carrier group. For example, the terminal device may switch the two transmit links from the first carrier group to the second carrier group in a switching time period T before an end moment t of the first carrier group. However, this application is not limited thereto. The network device does not schedule, in the switching time period T, the terminal device to send uplink information, and the terminal device does not send the uplink information in the switching time period T. According to this solution, the terminal device and the network device can reach an agreement. In addition, in this manner, the switching time period can occupy a small quantity of carrier resources. This can reduce a waste of resources and improve resource utilization.

For another example, in the example shown in FIG. 6, if the network device indicates the terminal device to switch the two transmit links from the carrier 2 to the carrier 1 and the carrier 3, the terminal device and the network device may determine that a carrier group that is in the first carrier group (including the carrier 2) and the second carrier group (including the carrier 1 and the carrier 3) and whose sum of carrier bandwidths of carriers is the smallest is the second carrier group, to determine that the switching time period is located in the second carrier group. For example, the terminal device may switch the two transmit links from the first carrier group to the second carrier group from a start moment t of the second carrier group. However, this application is not limited thereto. The network device does not schedule, in the switching time period T, the terminal device to send uplink information, and the terminal device does not send the uplink information in the switching time period T.

In an example, the third carrier group is a carrier group whose sum of carrier bandwidths of included carriers is the largest in the first carrier group and the second carrier group.

For example, the network device configures three carriers for the terminal device based on the third information, and indicates a carrier bandwidth of each carrier based on information A corresponding to each carrier. The terminal device determines, based on information A of the three carriers, that a carrier bandwidth of the carrier 1 is 20 MHZ, a carrier bandwidth of the carrier 2 is 100 MHz, and a carrier bandwidth of the carrier 3 is 40 MHZ.

For example, in the example shown in FIG. 5, when the two transmit links of the terminal device are respectively in the carrier 1 and the carrier 3, the network device indicates, based on the first information, the terminal device to switch the two transmit links to the carrier 2. After receiving the first information, the terminal device determines to switch the two transmit links from the carrier 1 and the carrier 3 to the carrier 2. In this case, the first carrier group includes the carrier 1 and the carrier 3, a sum of the carrier bandwidths of the carriers included in the first carrier group is 60 MHZ, the second carrier group includes the carrier 2, and a sum of the carrier bandwidth of the carrier included in the second carrier group is 100 MHz. The network device and the terminal device determine, based on that the second carrier group is the carrier group whose sum of the carrier bandwidths of the included carriers is the largest in the first carrier group and the second carrier group, that the switching time period is located in the second carrier group. For example, the switching time period is T, and the terminal device switches the two transmit links from the first carrier group to the second carrier group in the switching time period T starting from a start moment of the second carrier group. It should be understood that this application is not limited thereto. A specific start moment and end moment of the switching time period in the carrier group in which the switching time period is located may be determined based on specific implementation. The network device does not schedule, in the switching time period T, the terminal device to send uplink information, and the terminal device does not send the uplink information in the switching time period T. In this way, the terminal device and the network device can reach an agreement. This can reduce a waste of resources and improve resource utilization.

For another example, in the example shown in FIG. 6, when the two transmit links of the terminal device are in the carrier 2, the network device indicates, based on the first information, the terminal device to switch the two transmit links respectively to the carrier 1 and the carrier 3. In this example, the first carrier group includes the carrier 2, a sum of the carrier bandwidth of the carrier included in the first carrier group is 100 MHZ, the second carrier group includes the carrier 1 and the carrier 3, and a sum of the carrier bandwidths of the carriers included in the second carrier group is 60 MHz. The network device and the terminal device determine, based on that the carrier group whose sum of the carrier bandwidths of the included carriers is the largest in the first carrier group and the second carrier group is the first carrier group, that the switching time period is located in the first carrier group. For example, the switching time period is located in the first carrier group, and the terminal device switches the two transmit links from the first carrier group to the second carrier group before an end moment of the first carrier group. In this way, the terminal device and the network device can reach an agreement, and a waste of resources is caused by reserving the switching time period in both the carrier groups before and after the switching because no agreement is reached can be reduced. This can reduce a waste of resources and improve communication reliability.

In another example, the third carrier group is a carrier group to which a carrier whose carrier bandwidth is the largest belongs in the first carrier group and the second carrier group.

For example, the network device configures three carriers for the terminal device based on the third information, a carrier bandwidth of the carrier 1 is 20 MHz, a carrier bandwidth of the carrier 2 is 100 MHz, and a carrier bandwidth of the carrier 3 is 40 MHz. When the network device indicates the terminal device to switch the transmit links between the carrier 1, the carrier 2, and the carrier 3, the terminal device may determine that a carrier group to which the carrier 2 whose carrier bandwidth is the largest belongs is the carrier group in which the switching time period is located. For example, in the example shown in FIG. 5, if the network device indicates the terminal device to switch the transmit links from the carrier 1 and the carrier 3 to the carrier 2, the network device and the terminal device may determine that the switching time period is located in the second carrier group to which the carrier 2 belongs. For another example, in the example shown in FIG. 6, if the network device indicates the terminal device to switch the transmit links from the carrier 2 to the carrier 1 and the carrier 3, the network device and the terminal device may determine that the switching time period is located in the first carrier group to which the carrier 2 belongs. In this way, the terminal device and the network device can reach an agreement on the switching time period. This can reduce a waste of resources and improve communication reliability.

In another example, the third carrier group is a carrier group to which a carrier whose carrier bandwidth is the smallest belongs in the first carrier group and the second carrier group.

For example, the network device configures three carriers for the terminal device based on the third information, a carrier bandwidth of the carrier 1 is 20 MHZ, a carrier bandwidth of the carrier 2 is 100 MHz, and a carrier bandwidth of the carrier 3 is 40 MHz. When the network device indicates the terminal device to switch the transmit links between the carrier 1, the carrier 2, and the carrier 3, the terminal device may determine that the carrier group to which the carrier 1 whose carrier bandwidth is the smallest belongs is the carrier group in which the switching time period is located. For example, in the example shown in FIG. 5, if the network device indicates the terminal device to switch the transmit links from the carrier 1 and the carrier 3 to the carrier 2, the network device and the terminal device may determine that the switching time period is located in the first carrier group to which the carrier 1 belongs. For another example, in the example shown in FIG. 6, if the network device indicates the terminal device to switch the transmit links from the carrier 2 to the carrier 1 and the carrier 3, the network device and the terminal device may determine that the switching time period is located in the second carrier group to which the carrier 1 belongs. In this way, the terminal device and the network device can reach an agreement on the switching time period. This can reduce a waste of resources and improve communication reliability.

In another example, the third carrier group is a carrier group, in the first carrier group and the second carrier group, other than a carrier group to which a carrier whose carrier bandwidth is the largest belongs. In other words, the carrier group to which the carrier whose carrier bandwidth is the largest belongs in the first carrier group and the second carrier group is not the carrier group in which the switching time period is located.

For example, the network device configures three carriers for the terminal device based on the third information, a carrier bandwidth of the carrier 1 is 20 MHz, a carrier bandwidth of the carrier 2 is 100 MHz, and a carrier bandwidth of the carrier 3 is 40 MHz. When the network device indicates the terminal device to switch the transmit links between the carrier 1, the carrier 2, and the carrier 3, the terminal device may determine that the carrier group to which the carrier 2 whose carrier bandwidth is the largest is not the carrier group in which the switching time period is located. For example, in the example shown in FIG. 5, if the network device indicates the terminal device to switch the transmit links from the carrier 1 and the carrier 3 to the carrier 2, the network device and the terminal device may determine that the switching time period is located in the first carrier group in which the carrier 2 is not included. For another example, in the example shown in FIG. 6, if the network device indicates the terminal device to switch the transmit links from the carrier 2 to the carrier 1 and the carrier 3, the network device and the terminal device may determine that the switching time period is in the second carrier group in which the carrier 2 is not included. In this way, the terminal device and the network device can reach an agreement on the switching time period. This can reduce a waste of resources and improve communication reliability.

Implementation 3: The first parameter is the bandwidth part (BWP) in the carrier. The network device and the terminal device separately determine, based on a BWP in a carrier included in the first carrier group and a BWP in a carrier in the second carrier group, the carrier group in which the switching time period is located.

Optionally, the network device may send a plurality of pieces of information B to the terminal device, where the plurality of pieces of information B correspond to a plurality of carriers, the plurality of carriers are the plurality of carriers that are configured by the network device and that are used for switching the transmit link, and each piece of information B indicates at least one BWP in a corresponding carrier. The plurality of pieces of information B may be carried in a same message or different messages sent by the network device to the terminal device.

A BWP in one carrier is less than or equal to a carrier bandwidth of the carrier. The network device may configure a bandwidth size of the BWP based on a quantity of frequency domain resource blocks (RBs). Optionally, the size of the BWP may be determined based on the quantity of RBs. A larger quantity of RBs included in the BWP indicates a larger bandwidth of the BWP, and a smaller quantity of RBs included in the BWP indicates a smaller bandwidth of the BWP. Alternatively, the size of the BWP may be determined based on the quantity of RBs and a subcarrier spacing of the BWP.

In an example, the third carrier group is a carrier group whose sum of bandwidths of BWPs in included carriers is the largest or the smallest in the first carrier group and the second carrier group.

In another example, the third carrier group is a carrier group to which a carrier whose bandwidth of an included BWP is the largest or the smallest belongs in the first carrier group and the second carrier group.

In another example, the third carrier group is a carrier group, in the first carrier group and the second carrier group, other than a carrier group to which a carrier whose bandwidth of an included BWP is the largest belongs. In this example, if a BWP included in a carrier is a BWP that is in the BWPs included in the carriers in the first carrier group and the second carrier group and whose bandwidth is the largest, a carrier group to which the carrier including the BWP whose bandwidth is the largest belongs is not the carrier group in which the switching time period is located.

An implementation of determining the third carrier group based on the bandwidth of the BWP in the carrier is similar to the foregoing implementation of determining the third carrier group based on the carrier bandwidth of the carrier. For brevity, details are not described herein again.

Optionally, the first parameter is an activated BWP in the carrier, and the activated BWP is an activated BWP that is in the carrier and that is used for transmission of uplink information.

For example, a size of the BWP is determined based on a quantity of RBs. The network device configures, for the terminal device, three carriers used for switching the transmit link. If a bandwidth of an activated BWP in the carrier 1 is 100 RBs, a bandwidth of an activated BWP in the carrier 2 is 75 RBs, and a bandwidth of an activated BWP in the carrier 3 is 30 RBs, the terminal device and the network device may determine the third carrier group based on the bandwidths of the activated BWPs in the carriers included in the first carrier group and the second carrier group.

For another example, a size of the BWP is determined based on a quantity of RBs and a subcarrier spacing. The network device configures, for the terminal device, three carriers used for switching the transmit link. If an activated BWP in the carrier 1 includes 100 RBs, a subcarrier spacing is 30 kHz, and each RB includes 12 subcarriers, a size of a BWP in the carrier 1 is 100*12*30=36 MHz. If a bandwidth of an activated BWP in the carrier 2 is 75 RBs, and a subcarrier spacing is 30 kHz, a bandwidth of a BWP in the carrier 2 is 75*12*30=27 MHz. If a bandwidth of an activated BWP in the carrier 3 is 30 RBs, and a subcarrier spacing is 120 kHz, a size of a BWP in the carrier 3 is 30*12*120=43.2 MHz. In this case, the terminal device and the network device may determine the third carrier group based on the bandwidths of the activated BWPs in the carriers included in the first carrier group and the second carrier group.

Implementation 4: The first parameter is the identification information of the carrier, and the network device and the terminal device separately determine, based on identification information of a carrier included in the first carrier group and identification information of a carrier in the second carrier group, the carrier group in which the switching time period is located.

In an example, the network device may send fourth information to the terminal device, where the fourth information indicates identification information of a carrier in which the switching time period is located.

For example, the network device indicates, based on the first information, the terminal device to switch the at least one transmit link from the first carrier group to the second carrier group. The network device further sends the fourth information to the terminal device, where the fourth information may indicate the identification information of the carrier in which the switching time period is located. The fourth information may indicate identification information of one carrier, and the terminal device determines that the switching time period is located in a carrier group to which the carrier indicated by the fourth information belongs. Alternatively, the fourth information indicates identification information of each carrier in the carrier group in which the switching time period is located, and the terminal device may determine, based on the fourth information, the carrier group in which the switching time period is located.

By way of example, and not limitation, the fourth information may be an RRC message, a medium access control (MAC) control element (CE), or downlink control information (DCI).

The first information and the fourth information may be carried in a same message and sent by the network device to the terminal device, or the first information and the fourth information may be carried in different messages and sent by the network device to the terminal device.

In this implementation, the network device and the terminal device may determine, based on a size of the identification information of the carrier in the first carrier group and a size of the identification information of the carrier in the second carrier group, the carrier group in which the switching time period is located.

In an example, the third carrier group is a carrier group whose sum of identification information of carriers is the largest or the smallest in the first carrier group and the second carrier group.

In another example, the third carrier group is a carrier group to which a carrier whose identification information is the smallest or the largest belongs in the first carrier group and the second carrier group.

Optionally, the network device may send a plurality of pieces of information C to the terminal device, where the plurality of pieces of information C correspond to a plurality of carriers, the plurality of carriers are the plurality of carriers that are configured by the network device and that are used for switching the transmit link, and each piece of information C indicates identification information of a corresponding carrier. The plurality of pieces of information C may be carried in a same message or different messages sent by the network device to the terminal device.

Implementation 5: The first parameter is the identification information of the cell to which the carrier belongs. The network device and the terminal device may determine, based on a size of identification information of a cell to which a carrier in the first carrier group belongs and a size of identification information of a cell to which a carrier in the second carrier group belongs, the carrier group to which the switching time period is located.

For example, the network device sends fifth information to the terminal device, where the fifth information is used to configure a plurality of cells and a carrier of each of the plurality of cells. Carriers of the plurality of cells are carriers used for switching the transmit link. Optionally, the fifth information may alternatively indicate cell identification information of each of the plurality of cells. When indicating the terminal device to switch the transmit link, the network device may determine, based on identification information of a cell to which a carrier group (namely, the first carrier group) before the switching belongs and identification information of a cell to which a carrier group (namely, the second carrier group) after the switching belongs, the carrier group in which the switching time period is located.

Implementation 6: The first parameter is the switching parameter that is of the carrier and that is configured by the network device for the terminal device, and the network device and the terminal device separately determine, based on a switching parameter of a carrier in the first carrier group and a switching parameter of a carrier in the second carrier group, the carrier group in which the switching time period is located.

The network device configures, for the terminal device based on the third information, the plurality of carriers used for switching the transmit link, and the network device may further send information D to the terminal device, where the information D indicates a switching time period parameter of a corresponding carrier. When the network device indicates the terminal device to switch the transmit link, the network device and the terminal device separately determine, based on the switching parameter of the carrier in the first carrier group and the switching parameter of the carrier in the second carrier group, a carrier in which the switching time period is located.

Optionally, the switching parameter may be a value related to the switching time period.

For example, the network device configures, for the terminal device based on the third information, four carriers used for switching the transmit link, and the network device further configures, based on the information D, a value corresponding to each of the plurality of carriers. The information D may be 2 bits, and the network device may indicate one of four values 0 to 3 based on the 2 bits. For example, a switching parameter of the carrier 1 is 3, a switching parameter of the carrier 2 is 2, a switching parameter of the carrier 3 is 1, and a switching parameter of a carrier 4 is 0.

In an example, the network device and the terminal device may determine, based on a largest value or a smallest value of a sum of switching parameters of carriers in the first carrier group and the second carrier group, the carrier group in which the switching time period is located, that is, the third carrier group.

For example, when the network device indicates the terminal device to switch the transmit link from the carrier 1 and the carrier 2 to the carrier 3, the network device and the terminal device may separately determine that a sum of switching parameters of carriers in the first carrier group (including the carrier 1 and the carrier 2) is 5, and a sum of switching parameters of carriers in the second carrier group (including the carrier 3) is 1. If the switching time period is located in a carrier group whose sum of switching parameters is the largest, the network device and the terminal device may determine that the switching time period is located in the first carrier group. Alternatively, it may be specified that the switching time period is located in a carrier group whose sum of switching parameters is the smallest, and the network device and the terminal device may determine that the switching time period is located in the second carrier group. In this way, the terminal device and the network device can reach an agreement. This reduces a waste of resources and improves resource utilization.

In another example, the network device and the terminal device may determine that the carrier group (namely, the third carrier group) in which the switching time period is located is a carrier group to which a carrier whose corresponding switching parameter is the largest or the smallest belongs in the first carrier group and the second carrier group.

For example, when the network device indicates the terminal device to switch the transmit link from the first carrier group (including the carrier 1 and the carrier 2) to the second carrier group (including the carrier 3), the network device and the terminal device may separately determine that switching parameters corresponding to the carrier 1, the carrier 2, and the carrier 3 are 3, 2, and 1 respectively. For example, a protocol may specify that the switching time period is located in a carrier group to which a carrier whose switching parameter is the largest belongs. In this case, the network device and the terminal device may determine that the switching time period is located in the first carrier group to which the carrier 1 belongs. For example, the terminal device switches the transmit link in the switching time period before an end moment of the first carrier group. Alternatively, a protocol may specify that the switching time period is located in a carrier group to which a carrier whose switching parameter is the smallest belongs. In this case, the network device and the terminal device may determine that the switching time period is located in the second carrier group to which the carrier 3 belongs. For example, the terminal device switches the transmit link in the switching time period starting from a start moment of the carrier 3. In this way, the terminal device and the network device can reach an agreement. This reduces a waste of resources and improves resource utilization.

Optionally, the switching parameter may be a parameter that indicates whether the switching time period is located in one carrier and that is configured by the network device.

For example, the network device may configure, based on information E, whether each carrier used for switching the transmit link is the carrier in which the switching time period is located. For example, the information E may be an uplinkTxSwitchingPeriodLocation parameter. If the parameter is True, it indicates that the switching time period is located in the carrier. If the parameter is False, it indicates that the switching time period is not located in the carrier. The parameter may alternatively be null. In other words, the parameter may not be configured by the network device for the carrier used for switching the transmit link. According to the protocol, when the terminal device switches the transmit link from the first carrier group to the second carrier group, the switching time period is located in a carrier group in which a carrier whose included parameter is True is located in the first carrier group and the second carrier group. If neither the first carrier group nor the second carrier group includes the carrier whose parameter is True, the switching time period is located in a carrier group in which a carrier whose included parameter is False is located in the first carrier group and the second carrier group.

In another example, the network device and the terminal device may determine that the carrier group (namely, the third carrier group) in which the switching time period is located is a carrier group that does not include a carrier whose corresponding switching parameter is the largest or does not include a carrier whose corresponding switching parameter is the smallest in the first carrier group and the second carrier group. In other words, the network device and the terminal device may determine the carrier whose corresponding switching parameter is the largest in the first carrier group and the second carrier group, to determine that the switching time period is not located in a carrier group to which the carrier whose switching parameter is the largest belongs. Alternatively, the network device and the terminal device may determine the carrier whose corresponding switching parameter is the smallest in the first carrier group and the second carrier group, to determine that the switching time period is not located in a carrier group to which the carrier whose switching parameter is the smallest belongs.

Implementation 7: The first parameter indicates whether the cell in which the carrier is located is the PCell or the PSCell. The network device and the terminal device may determine, based on a first parameter of each carrier, whether a cell to which a carrier in the first carrier group and the second carrier group belongs is a PCell or a PSCell, to determine that the switching time period is not in a carrier group that includes the carrier that is in the PCell or the PSCell.

Optionally, when a second parameter of the first carrier group is the same as a second parameter of the second carrier group, the terminal device and the network device may determine the third carrier group in the foregoing manner of determining, based on the first parameter of the first carrier group and the first parameter of the second carrier group, the carrier group in which the switching time period is located. The second parameter is different from the first parameter, and the second parameter includes one or more of the following:

- a quantity of carriers, a carrier bandwidth of at least one carrier, a bandwidth part BWP in at least one carrier, identification information of at least one carrier, identification information of a cell to which at least one carrier belongs, a parameter indicating whether a cell in which a carrier is located is a PCell or a PSCell, or a switching parameter of at least one carrier.

In other words, in an implementation, before the terminal device and the network device determine, based on the first parameter of the first carrier group and the first parameter of the second carrier group, the carrier group in which the switching time period is located, the terminal device and the network device separately determine, based on the second parameter of the first carrier group and the second parameter of the second carrier group, the carrier group in which the switching time period is located. Then, if a parameter value of the second parameter of the first carrier group is the same as a parameter value of the second parameter of the second carrier group, the terminal device and the network device determine, based on the first parameter of the first carrier group and the first parameter of the second carrier group, that the carrier group in which the switching time period is located is the third carrier group.

The following uses an example to describe how to determine the third carrier group based on the first parameter of the first carrier group and the first parameter of the second carrier group when the second parameter of the first carrier group is the same as the second parameter of the second carrier group. It should be noted that the first parameter and the second parameter are two different parameters including but not limited to a carrier bandwidth of a carrier, a BWP in the carrier, identification information of the carrier, identification information of a cell to which the carrier belongs, a quantity of carriers included in a carrier group, and a switching parameter of at least one carrier. The first parameter and the second parameter in the following are merely examples. However, this application is not limited thereto.

In an example, the second parameter is the switching parameter of the carrier, and the first parameter is the carrier bandwidth of the carrier, the BWP in the carrier, the identification information of the carrier, the identification information of the cell to which the carrier belongs, or the quantity of carriers included in the carrier group.

Optionally, the switching parameter may be a parameter that indicates whether the switching time period is located in one carrier and that is configured by the network device. For example, the network device may configure, based on the information E, whether one carrier used for switching the transmit link is the carrier in which the switching time period is located. That the information E indicates True indicates that the switching time period is located in the carrier, and that the parameter indicates False indicates that the switching time period is not located in the carrier.

For example, the network device may configure, for the terminal device based on the third information, four carriers used for switching: the carrier 1, the carrier 2, the carrier 3, and the carrier 4. In addition, a switching parameter of each carrier is configured. For example, the switching parameter of the carrier 1 is True, the switching parameter of the carrier 2 is False, the switching parameter of the carrier 3 is True, and the switching parameter of the carrier 4 is False.

For example, when one transmit link of the terminal device is in the carrier 1, the network device indicates, based on the first information, the terminal device to switch the transmit link from the carrier 2 to the carrier 4. The terminal device and the network device determine, based on the switching parameter (that is, an example of the second parameter) of the first carrier group (including the carrier 2) and the switching parameter of the second carrier group (including the carrier 4), the carrier group in which the switching time period is located. Then, if both switching parameters of the carrier 2 and the carrier 4 are False, and the terminal device and the network device determine that a parameter value of the switching parameter of the first carrier group is the same as a parameter value of the switching parameter of the second carrier group, the terminal device and the network device determine, based on a first parameter of the carrier 2 and a first parameter of the carrier 4, the carrier group in which the switching time period is located. The first parameter may be the carrier bandwidth of the carrier, the BWP in the carrier, the identification information of the carrier, the identification information of the cell to which the carrier belongs, or the quantity of carriers included in the carrier group.

For another example, when the two transmit links of the terminal device are respectively in the carrier 1 and the carrier 2, the network device indicates, based on the first information, the terminal device to switch the two transmit links from the carrier 1 and the carrier 2 to the carrier 3. The terminal device and the network device determine, based on the switching parameters of the first carrier group (including the carrier 1 and the carrier 2) and the switching parameter of the second carrier group (including the carrier 4), the carrier group in which the switching time period is located. Then, if the first carrier group and the second carrier group include a same switching parameter, for example, if switching parameters of the carrier 1 in the first carrier group and the carrier 4 in the second carrier group are both True, and the terminal device and the network device determine that a parameter value of the switching parameter of the first carrier group is the same as a parameter value of the switching parameter of the second carrier group, the terminal device and the network device determine, based on a first parameter of the carrier 1 and a first parameter of the carrier 3, the carrier group in which the switching time period is located. Alternatively, a switching parameter is 1 bit. When the 1 bit indicates 1, it indicates True: or when the 1 bit indicates 0), it indicates False. The terminal device and the network device may determine, based on that a sum of switching parameters of carriers in the first carrier group (that is, a sum of a switching parameter 1 of the carrier 1 and a switching parameter 0 of the carrier 2 is 1) is equal to a sum of a switching parameter of a carrier in the second carrier group (that is, a switching parameter 1 of the carrier 3), that the parameter value of the second parameter of the first carrier group is equal to the parameter value of the second parameter of the second carrier group. Then, the terminal device and the network device determine, based on the first parameter of the carrier 1 and the first parameter of the carrier 3, the carrier group in which the switching time period is located.

In another example, the second parameter is the quantity of carriers in the carrier group, and the first parameter is the carrier bandwidth of the carrier in the carrier group.

For example, as shown in FIG. 7, the two transmit links of the terminal device are respectively in the carrier 2 and the carrier 4, and the network device indicates, based on the first information, the terminal device to switch the transmit links from the carrier 2 and the carrier 4 to the carrier 1 and the carrier 3. The first carrier group includes the carrier 2 and the carrier 4, the quantity of carriers in the first carrier group is 2, the second carrier group includes the carrier 1 and the carrier 3, and the quantity of carriers in the second carrier group is 2. The network device and the terminal device may determine that the second parameter of the first carrier group is the same as the second parameter of the second carrier group. Then, the network device and the terminal device determine the third carrier group based on carrier bandwidths of the carriers in the first carrier group and carrier bandwidths of the carriers in the second carrier group (that is, first parameters of the carrier groups), that is, determine the carrier group in which the switching time period is located. For example, the third carrier group is a carrier group whose sum of carrier bandwidths of carriers is the largest or the smallest in the first carrier group and the second carrier group. Alternatively, the third carrier group is a carrier group to which a carrier whose carrier bandwidth is the largest or the smallest belongs in the first carrier group and the second carrier group.

In another example, the second parameter is the quantity of carriers in the carrier group, and the first parameter is the switching parameter of the carrier in the carrier group.

For example, in the example shown in FIG. 7, the terminal device switches the transmit links from the carrier 2 and the carrier 4 to the carrier 1 and the carrier 3. A quantity of carriers included in the first carrier group is the same as a quantity of carriers included in the second carrier group. The network device and the terminal device may determine, based on switching parameters of the carriers in the first carrier group and switching parameters of the carriers in the second carrier group, the carrier group in which the switching time period is located. For example, the switching parameter is a value associated with the switching time period, and the third carrier group is a carrier group whose sum of switching parameters of carriers is largest or the smallest in the first carrier group and the second carrier group. Alternatively, the third carrier group is a carrier group to which a carrier whose switching parameter is largest or the smallest belongs in the first carrier group and the second carrier group.

In another example, the second parameter is the switching parameter of the carrier in the carrier group, and the first parameter indicates whether the cell to which the carrier in the 5 carrier group belongs is the PCell or the PSCell.

For example, the network device and the terminal device cannot determine, based on a switching parameter of a carrier in the first carrier group and a switching parameter of a carrier in the second carrier group, the carrier group in which the switching time period is located, for example, a sum of switching parameters of carriers in the first carrier group is the same as a sum of switching parameters of carriers in the second carrier group. Then, the network device and the terminal device determine, based on whether a cell to which a carrier in the first carrier group and the second carrier group belongs is a PCell or a PSCell, that the switching time period is not in the carrier group that includes the PCell or the PSCell. That is, the switching time period is in a carrier group that does not include the PCell or PSCell.

According to the foregoing implementation provided in this embodiment of this application, the network device and the terminal device follow a same manner of determining the carrier group in which the switching time period is located, so that the network device and the terminal device can reach an agreement on a carrier in which the switching time period is located during the switching of the transmit link. This can reduce a waste of resources and improve resource utilization.

It should be noted that the foregoing mainly describes a specific implementation of this application by using an example in which the terminal device switches the two transmit links from the first carrier group to the second carrier group. It should be understood that this application is not limited thereto. A manner that is of determining the switching time period and that is provided in this application is also applicable to a scenario in which the terminal device switches one, three, four, or more transmit links from the first carrier group to the second carrier group.

Figure 8:
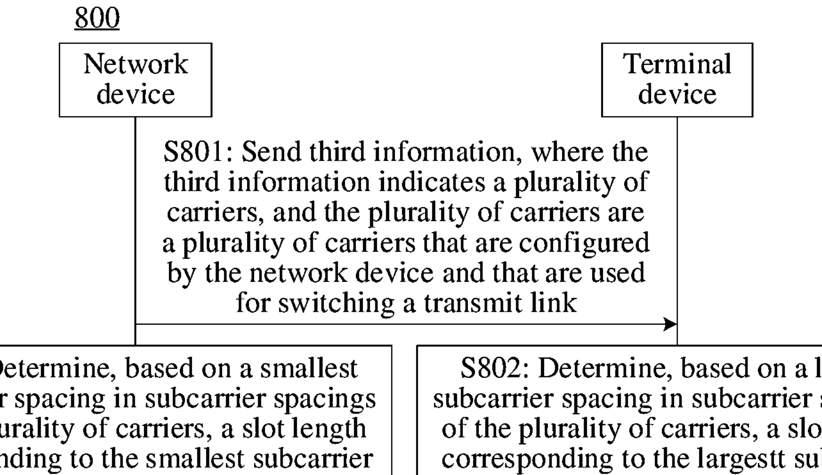
FIG. 8 is a schematic flowchart of a radio frequency link switching method according to an embodiment of this application.

FIG. 8 is another schematic flowchart of a radio frequency link switching method according to an embodiment of this application. It should be noted that the embodiment shown in FIG. 8 may be implemented separately, or may be implemented in combination with the embodiment shown in FIG. 4.

S801: A network device sends third information to a terminal device, where the third information indicates a plurality of carriers, and the plurality of carriers are a plurality of carriers that are configured by the network device and that are used for switching a transmit link.

Correspondingly, the terminal device receives the third information from the network device, and determines, based on the third information, the plurality of carriers that are configured by the network device and that are used for switching the transmit link.

Each of the plurality of carriers corresponds to one type of subcarrier spacing, the subcarrier spacing is a smallest allocation unit of a frequency domain resource, and the subcarrier spacing determines a time domain length of an orthogonal frequency division multiplexing (orthogonal frequency division multiplexing, OFDM) symbol. For example, when the subcarrier spacing is 15 kHz, a symbol length is ⅟15 kHz=66.7 μs. When a quantity of OFDM symbols included in a slot is a preset value, a larger subcarrier spacing of one carrier indicates a smaller slot length in a time domain resource on the carrier. For example, one slot includes 14 OFDM symbols, and each OFDM symbol includes one cyclic prefix (CP). When the subcarrier spacing is 15 kHz, a slot length (that is, duration of one slot) is 1 ms. When the subcarrier spacing is 30 kHz, a slot length (that is, duration of one slot) is 0.5 ms.

Optionally, the subcarrier spacing of the carrier may be but is not limited to 15 kHz, 30 kHz, 60 kHz, 120 kHz, or 240 kHz.

S802: The network device and the terminal device determine, based on a largest subcarrier spacing in subcarrier spacings of the plurality of carriers, a slot length corresponding to the largest subcarrier spacing, where the terminal device switches the transmit link at most once in the slot length.

Both the network device and the terminal device determine, based on the subcarrier spacings of the plurality of carriers that are configured by the network device for the terminal device and that are used for switching the transmit link, the slot length corresponding to the largest subcarrier spacing. The network device indicates the terminal device to switch the transmit link at most once in the slot length, and the terminal device switches the transmit link at most once in the slot length. In other words, the terminal device does not expect the network device to indicate the terminal device to switch the transmit link for a plurality of times in the slot length.

For example, the network device configures four carriers for the terminal device based on the third information, where a subcarrier spacing of a carrier 1 is 30 kHz, a subcarrier spacing of a carrier 2 is 15 kHz, a subcarrier spacing of a carrier 3 is 30 kHz, and a subcarrier spacing of a carrier 4 is 60 kHz. The network device and the terminal device may determine that a largest subcarrier spacing in the subcarrier spacings of the four carriers is 60 kHz. If a slot length corresponding to 60 kHz is 0.25 ms when each slot includes 14 OFDM symbols, the terminal device switches the transmit link at most once in 0.25 ms. In other words, the terminal device does not expect the network device to indicate the terminal device to switch the transmit link for the plurality of times in 0.25 ms, and the network device indicates the terminal device to switch the transmit link at most once in 0.25 ms. It should be noted that, in this example, the largest subcarrier spacing 60 kHz is the subcarrier spacing of the carrier 4. In the transmit link switching method provided in this application, regardless of whether a first carrier group before the switching in which the network device indicates the terminal device to switch the transmit link and a second carrier group after the switching in which the network device indicates the terminal device to switch the transmit link include the carrier 4, both the terminal device and the network device consider that the terminal device switches the transmit link only once in 0.25 ms.

According to the foregoing solution of this application, the terminal device and the network device may determine the largest subcarrier spacing based on the subcarrier spacings of the plurality of carriers that are configured by the network device and that are used for switching the transmit link, to determine that the terminal device switches the transmit link at most once in the slot length corresponding to the largest subcarrier spacing. In this way, the terminal device and the network device can reach an agreement on a time limit or a limit of times for switching the transmit link by the terminal device, and a case in which communication quality is affected because the terminal device frequently switches the transmit link can be avoided. When supported by a capability of the terminal device, the capability of the terminal device can be fully used to improve scheduling flexibility of the network device.

An embodiment of this application further proposes that a network device and a terminal device may determine, based on a largest subcarrier spacing in subcarrier spacings of carriers that are in activated states and that are used for switching a transmit link, a slot length corresponding to the largest subcarrier spacing, and the terminal device switches the transmit link at most once in the slot length.

For example, the network device configures four carriers for the terminal device based on third information. The network device and the terminal device determine, based on a largest subcarrier spacing in subcarrier spacings of three carriers in activated states, a slot length corresponding to the largest subcarrier spacing. The network device indicates the terminal device to switch the transmit link at most once in the slot length, and the terminal device switches the transmit link at most once in the slot length.

For example, in the four carriers, a subcarrier spacing of a carrier 1 is 30 kHz, a subcarrier spacing of a carrier 2 is 15 kHz, a subcarrier spacing of a carrier 3 is 30 kHz, and a subcarrier spacing of a carrier 4 is 60 kHz. If the carriers currently in the activated states are the carrier 1, the carrier 2, and the carrier 3, the network device and the terminal device determine that the largest subcarrier spacing in the subcarrier spacings of the three carriers is 30 kHz, and a slot length corresponding to the 30 kHz subcarrier spacing is 0.5 ms. In this case, when the three carriers are in the activated states, the terminal device switches the transmit link at most once in 0.5 ms, or the terminal device does not expect the network device to indicate the terminal device to switch the transmit link for a plurality of times in 0.5 ms, the network device indicates the terminal device to switch the transmit link at most once in 0.5 ms. In addition, regardless of whether the carrier 1 and the carrier 3 with 30 kHz subcarrier spacings relate to the switching of the transmit link, in other words, regardless of whether the carrier 1 and the carrier 3 belong to a first carrier group or a second carrier group, when the three carriers are in the activated states, both the terminal device and the network device use 0.5 ms as a time limit for the switching of the transmit link. When the carrier 4 is in an activated state, because the subcarrier spacing of the carrier 4 is a carrier that is in a carrier used for switching the transmit link and whose subcarrier spacing is the largest, the network device and the terminal device determine that a slot length corresponding to the 60 kHz subcarrier spacing of the carrier 4 is 0.25 ms. In this case, when the carrier 4 is in the activated state, the terminal device switches the transmit link at most once in 0.25 ms regardless of whether the carrier 4 relates to the switching of the transmit link.

An embodiment of this application proposes that a terminal device and a network device may determine, based on a capability of the terminal device, a time limit for switching a transmit link.

The terminal device sends first capability information to the network device, where the first capability information indicates first duration, and the terminal device switches the transmit link at most once in the first duration.

In other words, the terminal device reports, to the network device, capability information of switching the transmit link by the terminal device, and notifies the network device that the terminal device switches the transmit link at most once in the first duration, so that the network device indicates, after receiving the first capability information, the terminal device to switch the transmit link at most once in the first duration.

In an example, the first capability information may indicate the first duration or identification information of the first duration.

The network device may determine, based on the first duration or the identification information of the first duration in the first capability information, to indicate the terminal device to switch the transmit link at most once in the first duration.

In another example, the first capability information specifically indicates a first subcarrier spacing, and a slot length corresponding to the first subcarrier spacing is the first duration.

The first capability information may implicitly indicate the first duration in a manner of indicating the first subcarrier spacing. For example, a subcarrier spacing indicated by the first capability information sent by the terminal device to the network device is 30 kHz. After receiving the first capability information, the network device may determine that a slot length corresponding to the 30 kHz subcarrier spacing is 0.5 ms (for example, one slot includes 14 OFDM symbols). In this case, the first duration is 0.5 ms. The network device indicates the terminal device to switch the transmit link at most once in 0.5 ms, and the terminal device switches the transmit link at most once in 0.5 ms. Optionally, the first capability information may indicate identification information of the first subcarrier spacing.

In another example, the first capability information specifically indicates a first frequency band, and a slot length corresponding to a subcarrier spacing of the first frequency band is the first duration.

The first capability information may implicitly indicate the first duration in a manner of indicating the first frequency band. The first capability information may include identification information of the first frequency band. After receiving the first capability information, the network device determines that the first duration is the slot length corresponding to the subcarrier spacing of the first frequency band. The subcarrier spacing corresponding to the first frequency band may be predefined in a protocol, preconfigured in a network, or reported by the terminal device.

In another example, the first capability information specifically indicates a quantity N of symbols, duration of the N symbols in time domain is the first duration, and N is a positive integer.

Symbol duration (namely, duration of a symbol in time domain) of a symbol used to determine the first duration may be predefined in a protocol. For example, the protocol may specify that symbol duration corresponding to a quantity of symbols indicated by the first capability information is symbol duration corresponding to a 30 kHz subcarrier spacing. One symbol duration may be duration without a CP or duration with a CP. This is not limited in this application. For another example, the symbol duration may be symbol duration of an OFDM symbol that carries the first capability information. Alternatively, the symbol duration may be a symbol length corresponding to a largest subcarrier spacing in subcarrier spacings of a plurality of carriers that are configured by the network device for the terminal device and that are used for switching the transmit link. Alternatively, the symbol duration is determined in another manner. This is not limited in this application.

The network device may determine, based on the quantity N of symbols indicated by the first capability information, that the first duration is the duration of the N symbols. In this case, the network device indicates the terminal device to switch the transmit link at most once in the first duration, and the terminal device switches the transmit link at most once in the first duration.

In another example, the first capability information specifically indicates a quantity M of slots, duration of the M slots in time domain is the first duration, and M is a positive integer.

Duration of a slot used to determine the first duration (that is, duration of one slot in time domain) may be predefined in a protocol, may be duration of a slot that carries the first capability information, or may be a slot length corresponding to a largest subcarrier spacing in subcarrier spacings of a plurality of carriers that are configured by the network device for the terminal device and that are used for switching the transmit link. Alternatively, the duration of the slot is determined in another manner. This is not limited in this application.

An embodiment of this application proposes that a terminal device and a network device may determine, based on a frequency band in which the terminal device supports switching of a transmit link, a time limit for switching the transmit link.

The terminal device may send second capability information to the network device, where the second capability information indicates at least one frequency band in which the terminal device supports the switching of the transmit link.

Correspondingly, the network device receives the second capability information from the terminal device, and determines, based on the second capability information, the at least one frequency band in which the terminal device supports the switching of the transmit link.

The network device may determine a first subcarrier spacing based on the at least one frequency band indicated by the second capability information. The first subcarrier spacing is a largest subcarrier spacing in subcarrier spacings of the at least one frequency band. The network device may determine that a slot length corresponding to the largest subcarrier spacing is first duration. The network device indicates the terminal device to switch the transmit link at most once in the first duration.

The terminal device also determines, in a same manner, the largest subcarrier spacing in the subcarrier spacings of the at least one frequency band based on the at least one frequency band in which the terminal device supports the switching of the transmit link, where the slot length corresponding to the largest subcarrier spacing is the first duration. The terminal device switches the transmit link at most once in the first duration.

Optionally, in this application, a possible understanding manner of switching the transmit link at most once by the terminal device in the first duration is that an interval between two consecutive times of switching the transmit link by the terminal device is greater than or equal to the first duration, an interval between two consecutive times of indicating, by the network device, the terminal device to switch the transmit link (that is, first information is sent twice consecutively) is greater than or equal to the first duration, or the terminal device does not expect an interval between two consecutive times of indicating, by the network device, the terminal device to switch the transmit link (that is, first information is sent twice consecutively) is less than the first duration. In another possible understanding manner, if the first duration is a slot length, the terminal device can switch the transmit link only at most once in one slot length, and can switch the transmit link at most once in a next slot length of the slot length. If the transmit link is switched once in both of the two consecutive slot lengths, an interval between the two times of switching the transmit link may be less than the slot length. For example, the terminal device switches the transmit link once in duration of a penultimate symbol in the previous slot length, and switches the transmit link once in duration of a second symbol in the next slot length. However, this application is not limited thereto.

According to the foregoing solution of this application, the terminal device and the network device can reach an agreement on a time limit for switching the transmit link by the terminal device or a limit of times for switching the transmit link by the terminal device, a case in which communication quality is affected because the terminal device frequently switches the transmit link can be avoided, and a capability of the terminal device can be fully used to improve scheduling flexibility of the network device when supported by the capability of the terminal device. In various embodiments of this application, unless otherwise stated or there is a logic conflict, terms and/or descriptions in different examples are consistent and may be mutually referenced, and technical features in different examples may be combined based on an internal logical relationship thereof, to form a new example.

The method provided in embodiments of this application is described in detail above with reference to the accompanying drawings. A communication apparatus and a communication device provided in embodiments of this application are described in detail with reference to FIG. 9 and FIG. 10. To implement functions in the methods provided in the foregoing embodiments of this application, each network element may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 9:
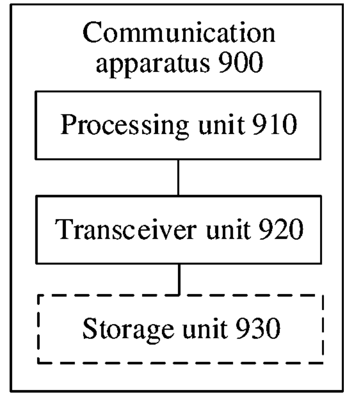
FIG. 9 is a block diagram of an example of a communication apparatus according to an embodiment of this application.

FIG. 9 is a block diagram of a communication apparatus according to an embodiment of this application. As shown in FIG. 9, the communication apparatus 900 may include a transceiver unit 920.

In a possible design, the communication apparatus 900 may correspond to the terminal apparatus in the foregoing method embodiment, and the communication apparatus 900 may be a terminal device or an apparatus configured in a terminal device, for example, a chip.

It should be understood that the communication apparatus 900 may correspond to the terminal apparatus in the method according to embodiments of this application. The communication apparatus 900 may include units configured to perform the method performed by the terminal apparatus in the methods in FIG. 4 and FIG. 8. In addition, the units in the communication apparatus 900 and the foregoing other operations and/or functions are separately used to implement corresponding procedures in the methods in FIG. 4 and FIG. 8.

Optionally, the communication apparatus 900 may further include a processing unit 910. The processing unit 910 may be configured to process instructions or data, to implement a corresponding operation.

It should be further understood that when the communication apparatus 900 is the chip configured (or used) in the terminal device, the transceiver unit 920 in the communication apparatus 900 may be an input/output interface or circuit in the chip, and the processing unit 910 in the communication apparatus 900 may be a processor in the chip.

Optionally, the communication apparatus 900 may further include a storage unit 930. The storage unit 930 may be configured to store instructions or data. The processing unit 910 may execute the instructions or the data stored in the storage unit, to enable the communication apparatus to implement a corresponding operation.

It should be further understood that a specific process in which the units perform the foregoing corresponding steps is described in detail in the foregoing method embodiments. For brevity, details are not described herein again.

In another possible design, the communication apparatus 900 may correspond to the communication apparatus in the foregoing method embodiment. The communication apparatus 900 may be a communication device or an apparatus configured in a communication device, for example, a chip. The communication device may be a terminal device or a network device.

It should be understood that the communication apparatus 900 may correspond to the communication apparatus in the method according to embodiments of this application. The communication apparatus 900 may include units configured to perform the method performed by the communication apparatus in the methods in FIG. 4 and FIG. 8. In addition, the units in the communication apparatus 900 and the foregoing other operations and/or functions are separately used to implement corresponding procedures in the methods in FIG. 4 and FIG. 8.

Optionally, the communication apparatus 900 may further include a processing unit 910. The processing unit 910 may be configured to process instructions or data, to implement a corresponding operation.

It should be further understood that when the communication apparatus 900 is the chip configured (or used) in the communication device, the transceiver unit 920 in the communication apparatus 900 may be an input/output interface or circuit in the chip, and the processing unit 910 in the communication apparatus 900 may be a processor in the chip.

Optionally, the communication apparatus 900 may further include a storage unit 930. The storage unit 930 may be configured to store instructions or data. The processing unit 910 may execute the instructions or the data stored in the storage unit, to enable the communication apparatus to implement a corresponding operation.

It should be further understood that a specific process in which the units perform the foregoing corresponding steps is described in detail in the foregoing method embodiments. For brevity, details are not described herein again.

Figure 10:
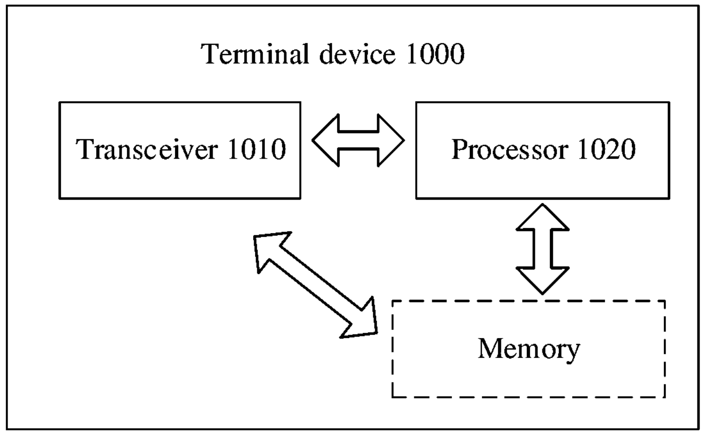
FIG. 10 is a diagram of a structure of an example of a terminal device according to an embodiment of this application.

It should be understood that the transceiver unit 920 in the communication apparatus 900 may be implemented through a communication interface (for example, a transceiver or an input/output interface), for example, may correspond to a transceiver 1010 in a terminal device 1000 shown in FIG. 10. The processing unit 910 in the communication apparatus 900 may be implemented by using at least one processor, for example, may correspond to a processor 1020 in the terminal device 1000 shown in FIG. 10. Alternatively, the processing unit 910 in the communication apparatus 900 may be implemented through at least one logic circuit. The storage unit 930 in the communication apparatus 900 may correspond to a memory in the terminal device 1000 shown in FIG. 10.

Figure 11:
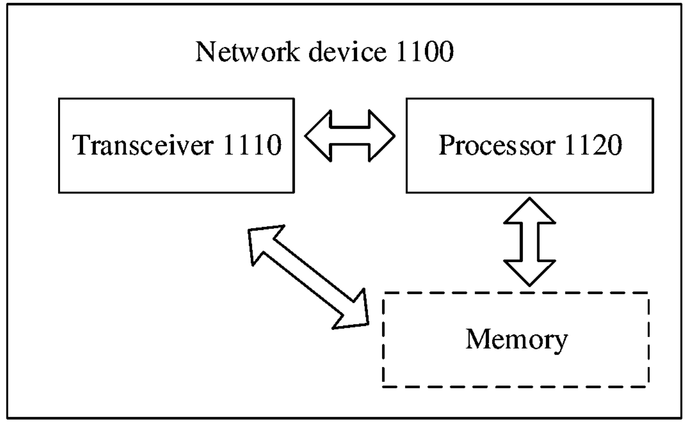
FIG. 11 is a diagram of a structure of an example of a network device according to an embodiment of this application.

It should be understood that when the communication apparatus 900 is a network device, the transceiver unit 920 in the communication apparatus 900 may be implemented through a communication interface (for example, a transceiver or an input/output interface), for example, may correspond to a transceiver 1110 in a network device 1100 shown in FIG. 11. The processing unit 910 in the communication apparatus 900 may be implemented by using at least one processor, for example, may correspond to a processor 1120 in the network device 1100 shown in FIG. 11. The processing unit 910 in the communication apparatus 900 may be implemented through at least one logic circuit.

FIG. 10 is a diagram of a structure of a terminal device 1000 according to an embodiment of this application. The terminal device 1000 may be used in the system shown in FIG. 1, to perform the functions of the terminal apparatus and the communication apparatus in the foregoing method embodiments. As shown in the figure, the terminal device 1000 includes a processor 1020 and a transceiver 1010. Optionally, the terminal device 1000 further includes a memory. The processor 1020, the transceiver 1010, and the memory may communicate with each other through an internal connection channel, to transfer a control signal and/or a data signal. The memory is configured to store a computer program, and the processor 1020 is configured to execute the computer program in the memory, to control the transceiver 1010 to receive and send a signal.

The processor 1020 and the memory may be integrated into one processing apparatus. The processor 1020 is configured to execute program code stored in the memory to implement the foregoing functions. During specific implementation, the memory may alternatively be integrated into the processor 1020, or may be independent of the processor 1020. The processor 1020 may correspond to the processing unit in FIG. 9.

The transceiver 1010 may correspond to the transceiver unit in FIG. 9. The transceiver 1010 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the terminal device 1000 shown in FIG. 10 can implement the processes of the terminal apparatus in the method embodiments shown in FIG. 4 and FIG. 8. The operations and/or the functions of the modules in the terminal device 1000 are separately used to implement corresponding procedures in the foregoing method embodiments. For details, refer to the descriptions in the foregoing method embodiments. To avoid repetition, detailed descriptions are properly omitted herein.

The processor 1020 may be configured to perform an action that is implemented inside the terminal apparatus and that is described in the foregoing method embodiments, and the transceiver 1010 may be configured to perform an action of sending or receiving that is described in the foregoing method embodiments. For details, refer to the descriptions in the foregoing method embodiments. Details are not described herein again.

Optionally, the terminal device 1000 may further include a power supply, configured to supply power to various components or circuits in the terminal device.

In addition, to make functions of the terminal device more perfect, the terminal device 1000 may further include an input/output apparatus, for example, include one or more of an input unit, a display unit, an audio circuit, a camera, a sensor, and the like, and the audio circuit may further include a speaker, a microphone, and the like.

FIG. 11 is a diagram of a structure of a network device according to an embodiment of this application. The network device 1100 may be used in the system shown in FIG. 1, to perform functions of the communication apparatus in the foregoing method embodiments. As shown in FIG. 11, the network device 1100 includes a processor 1120 and a transceiver 1110. Optionally, the network device 1100 further includes a memory. The processor 1120, the transceiver 1110, and the memory may communicate with each other through an internal connection channel, to transfer a control signal and/or a data signal. The memory is configured to store a computer program, and the processor 1120 is configured to execute the computer program in the memory, to control the transceiver 1110 to receive and send a signal.

The processor 1120 and the memory may be integrated into one processing apparatus. The processor 1120 is configured to execute program code stored in the memory to implement the foregoing functions. During specific implementation, the memory may alternatively be integrated into the processor 1120, or may be independent of the processor 1120. The processor 1120 may correspond to the processing unit in FIG. 9.

The transceiver 1110 may correspond to the transceiver unit in FIG. 9. The transceiver 1110 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the network device 1100 shown in FIG. 11 can implement the processes of the communication apparatus in the method embodiments shown in FIG. 4 and FIG. 8. The operations and/or the functions of the modules in the network device 1100 are separately used to implement corresponding procedures in the foregoing method embodiments. For details, refer to the descriptions in the foregoing method embodiments. To avoid repetition, detailed descriptions are properly omitted herein.

The processor 1120 may be configured to perform an action that is implemented inside the communication apparatus and that is described in the foregoing method embodiments, and the transceiver 1110 may be configured to perform an action of sending or receiving in the foregoing method embodiments. For details, refer to the descriptions in the foregoing method embodiments. Details are not described herein again.

An embodiment of this application further provides a processing apparatus, including a processor and a (communication) interface. The processor is configured to perform the method according to any one of the foregoing method embodiments.

It should be understood that the processing apparatus may be one or more chips. For example, the processing apparatus may be a field programmable gate array (FPGA), an application-specific integrated circuit (ASIC), a system-on-chip (SoC), a central processing unit (CPU), a network processor (NP), a digital signal processing circuit (DSP), a microcontroller (MCU), a programmable logic device (PLD), or another integrated chip.

According to the methods provided in embodiments of this application, this application further provides a computer program product. The computer program product includes computer program code. When the computer program code is executed by one or more processors, an apparatus including the processor is enabled to perform the methods in the embodiments shown in FIG. 4 and FIG. 8.

The technical solutions provided in embodiments of this application may be fully or partially implemented by software, hardware, firmware, or any combination thereof. When the software is used to implement embodiments, all or a part of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, a network device, a terminal device, a core network device, a machine learning device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium, or the like.

According to the methods provided in embodiments of this application, this application further provides a computer-readable storage medium. The computer-readable storage medium stores program code. When the program code is run by one or more processors, an apparatus including the processor is enabled to perform the methods in the embodiments shown in FIG. 4 and FIG. 8.

According to the method provided in embodiments of this application, this application further provides a system. The system includes the foregoing plurality of terminal apparatuses. The system may further include the foregoing one or more communication apparatuses.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings, direct couplings, or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A radio frequency link switching method, comprising:

receiving, by a terminal device, first information from a network device, wherein the first information indicates the terminal device to switch at least one transmit link from a first carrier group to a second carrier group; and determining, by the terminal device, a third carrier group based on a first parameter of the first carrier group and a first parameter of the second carrier group, wherein the third carrier group is the first carrier group or the second carrier group, and a switching time period of the at least one transmit link is located in the third carrier group, wherein the first parameter comprises one or more of a carrier bandwidth of at least one carrier, a bandwidth part in at least one carrier, identification information of at least one carrier, identification information of a cell to which at least one carrier belongs, or a quantity of carriers.

2. The radio frequency link switching method according to claim 1, wherein the third carrier group is a carrier group whose sum of parameter values of first parameters of comprised carriers is the largest or the smallest in the first carrier group and the second carrier group; or the third carrier group is a carrier group to which a carrier whose parameter value of a first parameter is the largest or the smallest belongs in the first carrier group and the second carrier group.

3. The radio frequency link switching method according to claim 1, further comprising:

determining, by the terminal device based on a largest subcarrier spacing in subcarrier spacings of a plurality of carriers, a slot length corresponding to the largest subcarrier spacing, wherein the terminal device switches the at least one transmit link at most once in the slot length.

4. The radio frequency link switching method according to claim 1, further comprising:

sending, by the terminal device, first capability information to the network device, wherein the first capability information indicates a first duration, and the terminal device switches the at least one transmit link at most once in the first duration.

5. The radio frequency link switching method according to claim 1, further comprising:

determining, by the terminal device, a first duration based on a first subcarrier spacing, wherein the terminal device switches the at least one transmit link at most once in the first duration, the first subcarrier spacing is a largest subcarrier spacing in a subcarrier spacing of at least one frequency band, and the at least one frequency band is a frequency band in which the terminal device supports the switching of the at least one transmit link.

6. A carrier switching method, comprising:

sending, by a network device, first information to a terminal device, wherein the first information indicates the terminal device to switch at least one transmit link from a first carrier group to a second carrier group; and determining, by the network device, a third carrier group based on a first parameter of the first carrier group and a first parameter of the second carrier group, wherein the third carrier group is the first carrier group or the second carrier group, and a switching time period of the at least one transmit link is located in the third carrier group, wherein the first parameter comprises one or more of a carrier bandwidth of at least one carrier, a bandwidth part in at least one carrier, identification information of at least one carrier, identification information of a cell to which at least one carrier belongs, or a quantity of carriers.

7. The carrier switching method according to claim 6, wherein the third carrier group is a carrier group whose sum of parameter values of first parameters of comprised carriers is the largest or the smallest in the first carrier group and the second carrier group; or the third carrier group is a carrier group to which a carrier whose parameter value of a first parameter is the largest or the smallest belongs in the first carrier group and the second carrier group.

8. The carrier switching method according to claim 6, further comprising:

determining, by the network device, a slot length based on a largest subcarrier spacing in subcarrier spacings of a plurality of carriers, wherein the network device indicates the terminal device to switch the at least one transmit link at most once in the slot length.

9. The carrier switching method according to claim 6, further comprising:

receiving, by the network device, first capability information from the terminal device, wherein the first capability information indicates a first duration, and the network device indicates the terminal device to switch the at least one transmit link at most once in the first duration.

10. The carrier switching method according to claim 6, further comprising:

determining, by the network device, a first duration based on a first subcarrier spacing, wherein the network device indicates the terminal device to switch the at least one transmit link at most once in the first duration, the first subcarrier spacing is a largest subcarrier spacing in a subcarrier spacing of at least one frequency band, and the at least one frequency band is a frequency band in which the terminal device supports the switching of the at least one transmit link.

11. A communication apparatus, comprising:

at least one processor; and a memory storing programming instructions that, when executed by the at least one processor, cause the communication apparatus to:

receive first information from a network device, wherein the first information indicates the communication apparatus to switch at least one transmit link from a first carrier group to a second carrier group; and determine a third carrier group based on a first parameter of the first carrier group and a first parameter of the second carrier group, wherein the third carrier group is the first carrier group or the second carrier group, and a switching time period of the at least one transmit link is located in the third carrier group, wherein the first parameter comprises one or more of a carrier bandwidth of at least one carrier, a bandwidth part in at least one carrier, identification information of at least one carrier, identification information of a cell to which at least one carrier belongs, or a quantity of carriers.

12. The communication apparatus according to claim 11, wherein the third carrier group is a carrier group whose sum of parameter values of first parameters of comprised carriers is the largest or the smallest in the first carrier group and the second carrier group; or the third carrier group is a carrier group to which a carrier whose parameter value of a first parameter is the largest or the smallest belongs in the first carrier group and the second carrier group.

13. The communication apparatus according to claim 11, wherein the communication apparatus is further caused to:

determine based on a largest subcarrier spacing in subcarrier spacings of a plurality of carriers, a slot length corresponding to the largest subcarrier spacing, wherein the communication apparatus switches the at least one transmit link at most once in the slot length.

14. The communication apparatus according to claim 11, wherein the communication apparatus is further caused to:

send first capability information to the network device, wherein the first capability information indicates a first duration, and the communication apparatus switches the at least one transmit link at most once in the first duration.

15. The communication apparatus according to claim 11, wherein the communication apparatus is further caused to:

determine a first duration based on a first subcarrier spacing, wherein the communication apparatus switches the at least one transmit link at most once in the first duration, the first subcarrier spacing is a largest subcarrier spacing in a subcarrier spacing of at least one frequency band, and the at least one frequency band is a frequency band in which the communication apparatus supports the switching of the at least one transmit link.

16. A communication apparatus, comprising:

at least one processor; and a memory storing programming instructions that, when executed by the at least one processor, cause the communication apparatus to:

send first information to a terminal device, wherein the first information indicates the terminal device to switch at least one transmit link from a first carrier group to a second carrier group; and determine a third carrier group based on a first parameter of the first carrier group and a first parameter of the second carrier group, wherein the third carrier group is the first carrier group or the second carrier group, and a switching time period of the at least one transmit link is located in the third carrier group, wherein the first parameter comprises one or more of a carrier bandwidth of at least one carrier, a bandwidth part in at least one carrier, identification information of at least one carrier, identification information of a cell to which at least one carrier belongs, or a quantity of carriers.

17. The communication apparatus according to claim 16, wherein the third carrier group is a carrier group whose sum of parameter values of first parameters of comprised carriers is the largest or the smallest in the first carrier group and the second carrier group; or the third carrier group is a carrier group to which a carrier whose parameter value of a first parameter is the largest or the smallest belongs in the first carrier group and the second carrier group.

18. The communication apparatus according to claim 16, wherein the communication apparatus is further caused to:

determine a slot length based on a largest subcarrier spacing in subcarrier spacings of a plurality of carriers, wherein the communication apparatus indicates the terminal device to switch the at least one transmit link at most once in the slot length.

19. The communication apparatus according to claim 16, wherein the communication apparatus is further caused to:

receive first capability information from the terminal device, wherein the first capability information indicates a first duration, and the communication apparatus indicates the terminal device to switch the at least one transmit link at most once in the first duration.

20. The communication apparatus according to claim 16, wherein the communication apparatus is further caused to:

determine a first duration based on a first subcarrier spacing, wherein the communication apparatus indicates the terminal device to switch the at least one transmit link at most once in the first duration, the first subcarrier spacing is a largest subcarrier spacing in a subcarrier spacing of at least one frequency band, and the at least one frequency band is a frequency band in which the terminal device supports the switching of the at least one transmit link.

* * * * *